US010395059B2

(12) United States Patent
Scaiano et al.

(10) Patent No.: US 10,395,059 B2
(45) Date of Patent: Aug. 27, 2019

(54) SYSTEM AND METHOD TO REDUCE A RISK OF RE-IDENTIFICATION OF TEXT DE-IDENTIFICATION TOOLS

(71) Applicant: Privacy Analytics Inc., Ottawa (CA)

(72) Inventors: Martin Scaiano, Ottawa (CA); Grant Middleton, Ottawa (CA); Varada Kolhatkar, Ottawa (CA); Khaled El Emam, Ottawa (CA)

(73) Assignee: PRIVACY ANALYTICS INC., Ottawa, ON (CA)

( * ) Notice: Subject to any disclaimer, the term of this patent is extended or adjusted under 35 U.S.C. 154(b) by 89 days.

(21) Appl. No.: 15/451,440

(22) Filed: Mar. 7, 2017

(65) Prior Publication Data

US 2017/0177907 A1  Jun. 22, 2017

Related U.S. Application Data

(63) Continuation-in-part of application No. 15/320,240, filed as application No. PCT/CA2016/050381 on Apr. 1, 2016.

(Continued)

(51) Int. Cl.
*G06F 21/00* (2013.01)
*G06F 21/62* (2013.01)
*G06N 7/00* (2006.01)

(52) U.S. Cl.
CPC ......... *G06F 21/6254* (2013.01); *G06N 7/005* (2013.01)

(58) Field of Classification Search
None
See application file for complete search history.

(56) References Cited

U.S. PATENT DOCUMENTS 9,442,980 B1   9/2016 Trepetin
2002/0169793 A1   11/2002 Sweeney
(Continued)

OTHER PUBLICATIONS

Diaz, C. et al., "Information Theory and Anonymity", Proceedings of the 23rd Symposium on Information Theory in the Benelux, Louvain la Neuve, Belgium, (8 pages total) (May 29, 2002).

(Continued)

*Primary Examiner* — Jeffery L Williams
(74) *Attorney, Agent, or Firm* — John Maldjian; Maldjian Law Group LLC

(57) ABSTRACT

A computer-implemented system and method to reduce re-identification risk of a data set. The method includes the steps of retrieving, via a database-facing communication channel, a data set from a database communicatively coupled to the processor, the data set selected to include patient medical records that meet a predetermined criteria; identifying, by a processor coupled to a memory, direct identifiers in the data set; identifying, by the processor, quasi-identifiers in the data set; calculating, by the processor, a first probability of re-identification from the direct identifiers; calculating, by the processor, a second probability of re-identification from the quasi-direct identifiers; perturbing, by the processor, the data set if one of the first probability or second probability exceeds a respective predetermined threshold, to produce a perturbed data set; and providing, via a user-facing communication channel, the perturbed data set to the requestor.

13 Claims, 9 Drawing Sheets

Related U.S. Application Data

(60) Provisional application No. 62/193,024, filed on Jul. 15, 2015, provisional application No. 62/371,709, filed on Aug. 5, 2016.

(56) References Cited

U.S. PATENT DOCUMENTS

| | | | |
|---|---|---|---|
| 2003/0061510 | A1 | 3/2003 | Hartmann |
| 2005/0038788 | A1* | 2/2005 | Dettinger ............ G06F 21/6227 |
| 2008/0168529 | A1* | 7/2008 | Anderson ............. G06F 21/577 |
| | | | 726/1 |
| 2010/0077006 | A1 | 3/2010 | El Emam et al. |
| 2010/0100577 | A1 | 4/2010 | Middleton |
| 2010/0114840 | A1 | 5/2010 | Srivastava |
| 2010/0332537 | A1 | 12/2010 | El Emam et al. |
| 2011/0178943 | A1 | 7/2011 | Motahari |
| 2011/0258206 | A1* | 10/2011 | El Emam ............. G06F 21/577 |
| | | | 707/754 |
| 2014/0019194 | A1 | 1/2014 | Anne |
| 2014/0081652 | A1 | 3/2014 | Klindworth |
| 2014/0189858 | A1 | 7/2014 | Chen et al. |
| 2014/0304244 | A1 | 10/2014 | Toyoda |
| 2015/0007249 | A1 | 1/2015 | Bezzi |
| 2015/0033356 | A1* | 1/2015 | Takenouchi ........ H04L 63/0407 |
| | | | 726/26 |
| 2015/0067602 | A1 | 3/2015 | Bernstein |
| 2015/0128285 | A1 | 5/2015 | LaFever et al. |
| 2015/0169895 | A1 | 6/2015 | Gkoulalas-Divanis et al. |
| 2015/0356591 | A1* | 12/2015 | Fano .................... G06Q 10/087 |
| | | | 705/14.27 |
| 2016/0034703 | A1 | 2/2016 | Dubov |
| 2016/0203172 | A1 | 7/2016 | Attaluri |
| 2016/0248799 | A1 | 8/2016 | Ng |
| 2017/0243028 | A1* | 8/2017 | LaFever ............. G06F 21/6254 |
| 2018/0114037 | A1 | 4/2018 | Scaiano |

OTHER PUBLICATIONS

Bezzi, M., "An Entropy based method for measuring anonymity", Proceedings of the IEEE Third International Conference on Security and Privacy in Communications Networks and the Workshops, SecureComm 2007, Nice, France, (5 pages, total) (Sep. 17, 2007).

Kounine, A et al., "Assessing Disclosure Risk in Anonymized Datasets", Proceedings of FloCon2008, Savannah, Georgia, USA, (4 pages total) (Jul. 1, 2008).

Serjatnov, A et al., "Towards an Information Theoretic Metric for Anonymity", Proceedings of the Second International Workshop on Privacy Enhancing Technologies, PET 2002, San Francisco, CA, USA, (14 pages total) (Apr. 14, 2002).

Diaz, C. et al., "Towards measuring anonymity", Proceedings of the Second International Workshop on Privacy Enhancing Technologies, PET 2002, San Francisco, CA, USA, (15 pages total) (Apr. 14, 2002).

Trabelsi, S. et al., "Data Disclosure Risk Evaluation", Proceedings of the Fourth International Conference on Risks and Security of Internet and Systems (CRISIS 2009), Toulouse, France, pp. 35-42 (8 pages total) (Oct. 19, 2009).

Toth, G. et al., "Measuring Anonymity Revisited", Proceedings of the Ninth Nordic Workshop on Secure IT, Espoo, Finland, (6 pages total) (Apr. 11, 2004).

Airoldi, E.M. et al., "An entropy approach to disclosure risk assessment: Lessons from real applications and simulated domains", Decision Support Systems, vol. 51, issue 1, pp. 10-20, (11 pages total) (Jan. 4, 2011).

International Search Report and Written Opinion dated Jun. 5, 2016 issued in connection with International Application No. PCT/CA2016/050381 (10 pages total).

* cited by examiner

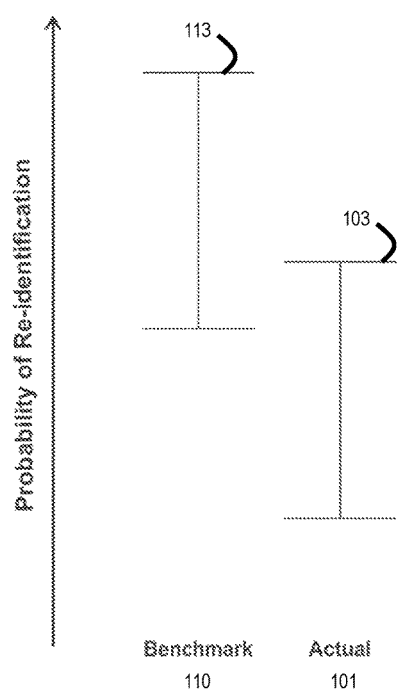
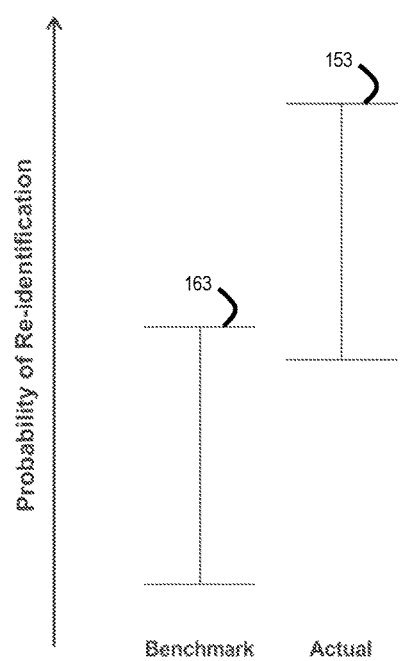
FIG. 1A
100
FIG. 1B
150

200

300

500

600

800

900

SYSTEM AND METHOD TO REDUCE A RISK OF RE-IDENTIFICATION OF TEXT DE-IDENTIFICATION TOOLS

CROSS-REFERENCE TO RELATED APPLICATIONS

This application is a continuation-in-part of U.S. patent application Ser. No. 15/320,240, filed on Dec. 19, 2016, which claims benefit and priority to International Application No. PCT/CA2016/050381, filed Apr. 1, 2016, which claims priority to U.S. Provisional Application No. 62/193,024 filed Jul. 15, 2015. This application also claims the benefit of U.S. Provisional Patent Application Ser. No. 62/371,709, filed on Aug. 5, 2016. The entire content of all of these applications are hereby incorporated by reference in their entireties.

BACKGROUND

Field

The present disclosure relates to risk assessment of data sets and in particular to assessing re-identification risk of a person identified in the data set.

Description of Related Art

BRIEF SUMMARY

De-identification (de-id) is a process of masking direct identifiers (DIs) and perturbing (i.e., altering) quasi-identifiers (QIs)—also known as indirect-identifiers—until a risk of re-identification (re-id) is below a predetermined threshold.

It has become regular practice to de-identify unstructured medical text for use in research using automatic methods, the goal of which is to remove patient identifying information (PII) to minimize re-identification risk. The metrics commonly used to determine whether these systems are performing well do not accurately reflect the risk of a patient being re-identified. Embodiments in accordance with the present disclosure include a system and method for measuring the risk associated with textual data releases.

Embodiments in accordance with the present disclosure provide a system and method to improve de-identification of patient data by calculating a probability of re-identification from a de-identified text document, using more precise modeling of risks from an adversary. Embodiments may provide higher probability calculations than under approaches of the background art in some instances, or lower probability calculations than the background art in other instances. Embodiments provide a more accurate way to assess the probability of re-identification compared to the background art.

Embodiments in accordance with the present disclosure also provide methods to account for an uncertainty in estimated values, and comparing computed risk values to benchmarks or thresholds in a formal manner. Embodiments facilitate a precise determination of whether an actual probability of re-identification is acceptably small. Embodiments account for corpus size used to perform the evaluations.

Embodiments in accordance with the present disclosure include a system and a method to produce a more accurate estimation of a probability of re-identification of a data set, in order to produce a de-identified data set.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein:

FIGS. 1A-1B illustrate a comparison of benchmark and actual distributions, in accordance with an embodiment of the present disclosure;

Figure 2:
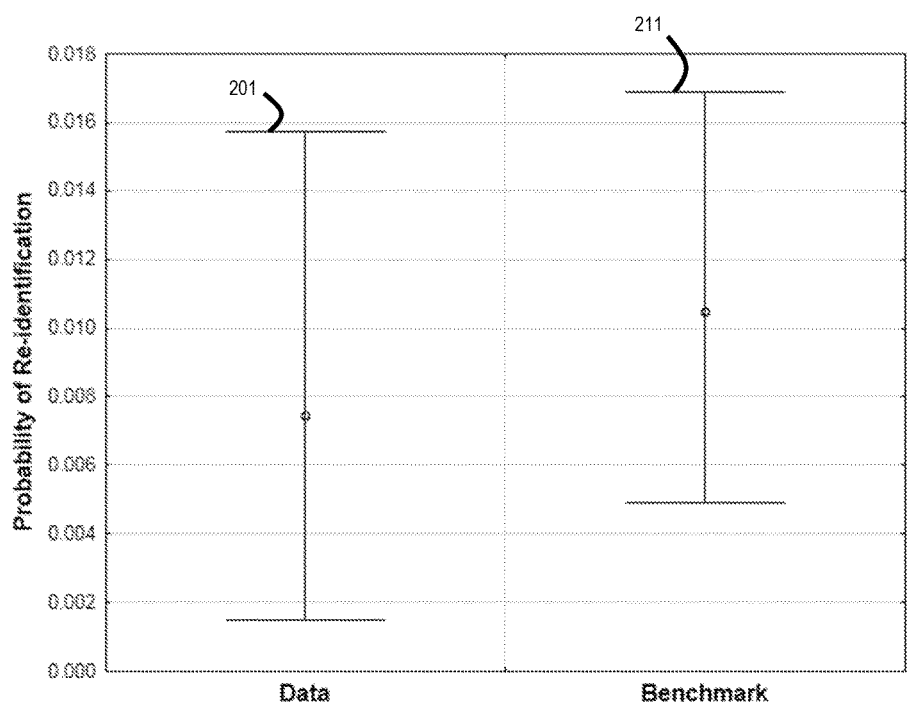
FIG. 2 illustrates a comparison of a confidence interval for direct identifiers derived from data to the benchmark, in accordance with an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary computing and storage system. Although well suited for use with, e.g., a system using a server(s), data sources and/or database(s), the disclosure is not limited to use with any particular type of computing, communication and storage system or configuration of system elements. Those skilled in the art will recognize that the disclosed techniques may be used in any computing, communication and storage application in which it is desirable to store protected data.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing sets of computer code in a processor that performs the function; providing provisionable configuration parameters that control, limit, enable or disable capabilities of the module (e.g., setting a flag, setting permissions, setting threshold levels used at decision points, etc.); providing or removing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; setting a value of an adjustable component (e.g., a tunable resistance or capacitance, etc.), energizing a circuit that performs the function (e.g., providing power to a transceiver circuit in order to receive data); providing the module in a physical size that inherently performs the function (e.g., an RF antenna whose gain and operating frequency range is determined or constrained by the physical size of the RF antenna, etc.), and so forth.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes a computer readable signal medium such as a propagating signal. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

As used herein, "text" or "text files" may refer to substantially any textual or natural language content, which may be stored in files, or may be represented as a column in database, or as an element in XML, or as substantially any unit in a larger structured dataset that stores textual content.

Certain sensitive personal information like patient health information is protected by law (e.g., Healthcare Information Portability and Accountability Act ("HIPAA," codified at 42 U.S.C. § 300gg and 29 U.S.C § 1181 et seq. and 42 USC 1320d et seq.) in the U.S.) and must be treated in a way that maintains patient privacy. Such information is termed protected health information (PHI). With respect to PHI, it is important to avoid disclosing the PHI of a specific patient, or to disclose PHI so specific that it discloses an identity of a specific patient. All stakeholders involved must accept their stewardship role for protecting the PHI data contained within. It is essential that systems that access the PHI do so in full compliance with HIPAA and any other applicable laws or regulations of the country concerned, and in a secure manner. PII refers to personally identifying information that may be used in a re-identification attempt (i.e., DIs and QIs). PHI may refer to PII that is protected under HIPAA. The terms PHI and PII are used interchangeably in this document unless clearly indicated otherwise, either explicitly or by context. By protecting PII and data subjects from re-identification, embodiments also protect PHI from being associated with the respective data subjects.

Embodiments in accordance with the present disclosure are applied to a data set from the University of Michigan Medical School. Risk assessment results are then compared with those that would be obtained using a typical contemporary micro-average evaluation of recall in order to illustrate the difference between the proposed evaluation system and method and the current baseline.

Text files being processed for de-identification may include direct identifiers ("DIs") and/or quasi-identifiers ("QIs"). DIs and QIs may be known as personally identifying information (PII)), some of which may be detected by a de-identification process (either an automatic or a manual process) and some which may be missed (i.e., not detected) by the de-identification process.

For the purpose of this disclosure, the term "leak" refers to PII in a document that should have been detected and transformed but was not, and as a consequence remains in its original form in the document instead of in a de-identified form. "Leak rate" refers to the fraction (in a range of [0, 1.0], inclusive) or to the percentage (in a range of [0%, 100%], inclusive) of PHI that was leaked. "Catch" refers to PII detected in the document. "Catch rate" (in a range of [0, 1.0], inclusive) may be calculated by the equation: 1—leak rate, because any PII is either detected or not detected (i.e., PII is either caught or leaked), but not both, so leak rate represents everything not caught.

Leak rates may be determined using a subsample of a corpus (the corpus being a set of documents to be de-identified). The subsample is normally reviewed by two or more annotators (e.g., humans skilled in the process of de-identification) to find PHI that was not detected. The leak rate of the subsample maybe used as an estimate of the leak rate of the corpus. The leak rate is usually bounded by a confidence interval. If two or more skilled human annotators completely processed the corpus, the leak rate would no longer be an estimate.

Text masking schemes of the known art do not measure risk of a transformation of PII (a transformation being, e.g., a perturbation such as a generalization, or an addition of noise) or intentionally retaining PII. Instead, text masking schemes focus on recall (i.e., leak rate) of PII. Embodiments include a method to de-identify text files, which accounts for a risk of re-identification of intentional retention or transformation of caught PII (i.e., Risk(X|catch) where "X" is the data) and the risk of re-identification of leaked PII (i.e., Risk(X|leak)). In this disclosure, unless clearly indicated otherwise, "risk" refers to a risk of re-identification. Embodiments may refer to a risk measurement that accounts for both of these risks as a combined risk.

For further clarity, the background art measures risk caused by leaking PII that should have been transformed in the de-identified data, but the background art does not account for an inherent risk of the de-identified data. For an example of inherent risk, the data would still present some risk even if there were no leaks. Embodiments, may use a risk computed on a structured data set (e.g., on a database), and may consider the applied de-identification as the target state, and then compute a risk of re-identification accounting for the risk inherent in the target state and the additional risk associated with leaked PHI.

Embodiments present a significant improvement over the background art by accounting for a risk inherent in a target state (an exemplary target state being ideal de-identified data assuming no leaks), because the validity of the target state and leak rate now can be evaluated. Furthermore, if the re-id risk is significantly below an acceptable threshold for a given target state (e.g., a target state of ideal de-identification) and given leak rate, then the target state may be changed (e.g., to less than ideal de-identification) in order to give better data quality, while still having a risk of re-id below the risk threshold.

Embodiments may use primarily two inputs: a structured dataset and a leak rate. Let "distributional metrics" refer to metrics that describe a frequency of occurrences of PII in documents and the corpus. Some distributional metrics may be used in combination with leak rate. Examples of distributional metrics include a number of PII (or QIs) per patient, a percentage of patient with PII of a specific type, an average rate of repetition of a value, an average number of distinct PII per patient, etc.

Embodiments disclose a complex but more accurate methodology to model a risk of re-identification from leaked DIs and QIs, compared to the background art. This methodology may be used to compute a risk of re-identification from leaked PII. Embodiments may calculate a combined risk by adding together these two risks, as shown below in Equation (1):

$$\text{combined\_risk}(X) = \text{Risk}(X|\text{catch}) + \text{Risk}(X|\text{leak}) \quad (1)$$

The risk of re-identification for DIs and QIs is computed separately and differently, each with their own threshold.

The risk measurement for DIs presented in the embodiment has a single mode of application.

For the risk measurement of QIs, embodiments depend on use of risk of re-identification methodology, such as K-anonymity. K-anonymity is known in the art and is a method of protecting privacy by having data subjects look like one another. For a dataset to be K-anonymous, each data subject must be indistinguishable (using quasi-identifiers) from "K" other individuals. Embodiments may use the risk of re-identification methodology of K-Estimate Risk Measurement using Information Theory ("KERMIT"), as disclosed in parent application U.S. patent application Ser. No. 15/320,240 ("the '240 application"), which may calculate a risk of re-identification of a structured dataset. A process using the KERMIT methodology may be referred to herein as a KERMIT process or a KERMIT methodology.

A KERMIT process is suitable especially for textual datasets. Embodiments use two modes of applying the KERMIT process with regard to including a risk of re-identification from leak. A first mode allows a separate external calculation of the risk of re-identification from leaked PII. A second mode integrates the risk of leaked PII into the KERMIT methodology. The fully integrated methodology is especially suitable because it provides the most accurate model.

Embodiments, when integrating risk from leaking PII with the structure of the KERMIT risk measurement process, model risks of substantially all possible leak scenarios. A leak scenario is a combination of a PII being leaked and caught.

For example, consider a patient with PII A and B. Embodiments may compute separate re-identification risks assuming: (1) both A, B are leaked (i.e., Risk(A B)); (2) A is caught and transformed and B is leaked (i.e., Risk(A' B); (3) B is caught and transformed and A is leaked (i.e., Risk(A B'); and (4) A, B are caught and transformed (i.e., Risk(A' B')). Embodiments then may use a leak rate to weight a likelihood of each of these scenarios occurring. For example, let l be the leak rate. The probability of two leaks is l*l, and the combined risk is listed below in Equation (2):

$$\text{combined\_risk}(AB) = l^2 R(A,B) + l(1-l)R(A',B) + l(1-l)R(A,B') + (1-l)^2 R(A',B') \quad (2)$$

Embodiments, using metrics known in the art, provide a more realistic measurement of the risk associated with an automated text anonymization process. The 95% confidence interval for these estimates produced by the embodiments is less than the 95% confidence interval for the relevant benchmark and threshold respectively. The benchmark and threshold were determined based on the data and the context of the data release using de-identification methods for structured data known in the art. The context of the data release includes limitations on usage of the data, such as whether contracts related to the data are in place, are they enforceable, do they cover key restrictions, how much physical and digital security exists, what access controls exist, does the recipient have means or motive to re-identify people. The release context may be modeled as a probability of one or more of an intentional attempt, an inadvertent re-identification, and/or a breach. De-identification is dependent on the context of the data release. More trusted and secure organizations may be given better quality data.

Embodiments in accordance with the present disclosure may correct for poorly distributed evaluation corpora (i.e., test data), while considering the data release context, and avoid optimistic assumptions that are a disadvantage of the background art. Embodiments provide a more accurate estimate of a probability of re-identification. Embodiments may be used to compute re-identification risk in order to evaluate more realistically future text de-identification tools.

BACKGROUND AND COMPARISON

There has been significant research on developing tools for the de-identification of freeform medical text. The evaluation methods known in the art to determine whether these tools are performing well enough are borrowed from the areas of entity extraction and information retrieval. However, these evaluation approaches are not always the most appropriate for measuring the probability of re-identification, nor are the benchmarks typically used to decide what is "good enough" directly relevant to the de-identification task.

A disadvantage of the background art is that in some instances they inflate the apparent performance of de-identification tools by making them look better than they really are, and in other instances methods of the background art may deflate the apparent performance by making it seem much worse than it really is. In contrast, embodiments in accordance with the present disclosure will not give consistently higher risk values or lower risk values than currently used methods, although embodiments provide more accurate modeling of a probability of re-identification. Embodiments have been applied to a clinical data set, and results from using the embodiments are compared to results from using evaluation methods of the background art.

Most de-identification systems of the background art treat Personal Health Information (PHI) identification as a named entity recognition problem. Consequently, they evaluate the identification performance with metrics used in named entity recognition and information retrieval. In particular, they typically annotate different types of entities (or categories), such as date, patient name, and ID, and report performance primarily using three metrics: precision, recall, and f-measure. Let tp be the number of true positive annotations, fp be the number of false positive annotations, and fn be the number of false negative annotations. Then, recall "r" and precision "p" are given by Equations (3) and (4) below, respectively.

$$r = \frac{tp}{tp + fn} \quad (3)$$

$$p = \frac{tp}{tp + fp} \quad (4)$$

Since true positives tp and false positives fp necessarily must add up to the total number of positives, then precision p may be thought of as a measure of how "correct" a positive determination will be, on average. Precision also may be thought of as an answer to the question "Did we label only what we were looking for?"

Similarly, since the number of true positives tp (problematic identifiers that were identified) and the number of false negatives fn (problematic identifiers that were not identified) add up to the total number of problematic identifiers, then recall r may be through of as a measure of a probability of detection of a problematic identifier. Recall also may be thought of as an answer to the question "Did we find all that we were looking for?"

The metric f-measure combines precision and recall, typically by calculating a harmonic mean of the two. To get a sense of the overall performance of a system, the most commonly used metrics are a micro-average and macro-average of the parameters precision, recall, and f-measure. To compute micro-average, one creates a contingency table (e.g., a confusion matrix as known in the art) for all categories and then computes precision and recall from this table, giving equal weight to each PHI instance, irrespective of its category. For example, consider an evaluation of ten categories. For each category, embodiments compute true positives, false negatives, false positives, true negatives: $tp_i$, $fp_i$, $fn_i$, $tn_i$, $\{i:[1,10]\}$ respectively. Embodiments then may create one set of true positives, false negatives, false positives, true negatives. This operation is micro-averaging the results from each document. Subsequent precision and recall can be computed from these metrics as shown below in Equations (5a)-(5d):

$$tp = \sum_{i=1}^{n} tp_i \quad (5a)$$

$$fp = \sum_{i=1}^{n} fp_i \quad (5b)$$

$$fn = \sum_{i=1}^{n} fn_i \quad (5c)$$

$$tn = \sum_{i=1}^{n} tn_i \quad (5d)$$

To compute macro-average, one computes precision and recall for each category separately, giving equal weight to each category, and then averages them over all categories to get an overall measure of performance. For example, consider an evaluation of ten categories. For each category, embodiments may compute true positives, false negatives, false positives, true negatives: $tp_i$, $fp_i$, $fn_i$, $tn_i$ $\{i:[1,10]\}$ respectively. Embodiments then may create precision or recall for each category ($P_i$, $R_i$), as shown below in Equations (6a)-(6d). Finally, embodiments average the recall on each category to get a single file recall.

$$R_i = \frac{tp_i}{tp_i + fn_i} \quad (6a)$$

$$P_i = \frac{tp_i}{tp_i + fp_i} \quad (6b)$$

$$R = \frac{1}{n} \sum_{i=1}^{n} R_i \quad (6c)$$

$$P = \frac{1}{n} \sum_{i=1}^{n} P_i \quad (6d)$$

Table 1 summarizes commonly used evaluation metrics in the medical text de-identification literature of the background art. Early approaches report either precision, recall, or false positives, and false negatives. Later approaches started reporting category-wise and micro-average precision, recall, and f-measure. Recent approaches to text de-identification also report macro-average along with micro-average. Some approaches report accuracy, which considers both true and false positives and true and false negatives, in contrast to precision, which consider only true and false positives. Some background art reports results for critical vs. non-critical PHI, along with standard category-based and micro-average precision and recall.

In Table 1, the number of clinical notes (i.e., number of patients) used in different approaches range from 100 to 7,193. The known rule-based approaches use a majority of the documents for developing and tuning rules, and machine learning approaches use a majority of documents for training and tuning machine learning classifiers. The test documents used by different approaches range from 220 to 514. Other studies have 220 and 514 test documents, respectively.

For text de-identification, current evaluation approaches of the background art are limited in at least three ways. First, they report performance on all instances of an entity across all documents. Note that typically one document corresponds to one patient and de-identification is about protecting patients. However, none of the approaches consider the number of PHI elements missed within a document, which is an important aspect in de-identification, as a document typically corresponds to a patient and leaks within a document means potentially revealing the identity of that patient. The number of missed PHI elements within the document is determined by creating a "perfect" result as best as possible by hand (i.e., a pseudo-perfect result), and then comparing the pseudo-perfect result to the de-id document generated by automated methods. In other words, current evaluation approaches do not truly reflect the risk of a patient being re-identified. Second, approaches of the background art evaluate all types of entities (i.e., types of PHI) with the same evaluation metric, giving equal weight to each entity type, even though directly identifying entities, such as name and address, have a higher risk of re-identification compared to indirectly identifying entities, such as age and race. Finally, approaches of the background art do not account for the distribution of PHI across documents. For example, an entity type that is rare and appears in very few documents will have a higher sensitivity to the performance of an information extraction tool than a more prevalent entity type.

Embodiments critically build upon the background art to evaluate medical text de-identification tools, attempt to overcome their weaknesses, and provide improvements. Embodiments provide a unified system and method for evaluation in terms of the probability of re-identification when text (e.g., a medical note) is de-identified using automated tools. Embodiments bring multiple concepts together from disclosure control, information retrieval, and risk modeling to provide a more detailed evaluation system and method for measuring re-identification risk. Embodiments also provide a more accurate model of a risk of re-identification compared to the background art.

TABLE 1

Summary of evaluation metrics in the medical text de-identification literature.

| Corpora and number of documents | Evaluation metrics | Comments |
|---|---|---|
| 275 patient records from 3,198 letters | P with 2 likelihood score thresholds, which control over-scrubbing | Number of categories: 25<br>Examples: first name, date, age |
| 800 medical documents (post-operative reports, laboratory and test results, and discharge summaries, mostly in French) | TP, FP, FN, PHI removed with removing also irrelevant tokens, PHI incompletely removed | Number of categories: 2<br>Examples: PHI and Non-PHI |
| 1,001 pathology reports from Regenstrief Medical Record System | P | Number of categories: 1<br>Patient Names |
| 7,710 proper names<br>Training: 1,350 randomly selected reports from pediatric patients | P and R | Number of categories: 1<br>Patient Names |
| A surgical pathological text corpus obtained from JHARCOLL (567,921 pathology phrases) | P and R | Actual precision and recall numbers are not reported |
| Training and tuning: 1,000 reports<br>Testing: 300 reports | FP and FN | |
| Tested on 1800 reports (600 * 3 hospitals)<br>4515 PHI | Accuracy and FN | |
| 889 discharge summaries from i2b2 de-id challenge<br>(Training: 669, Testing: 220) | Micro-average and category-wise P, R, F | Number of categories: 8<br>Examples: Age, Date, Doctor, Hospital, ID, Location, Patient, Phone |
| Partners Healthcare: medical discharge summaries<br>Number of PHI = 14,498 | Micro-average and category-wise P, R, F (entity-level and token-level) | Number of categories: 9<br>Examples: Age, Date, Doctor, Hospital, ID, Location, Patient, Phone, and non-PHI<br>Reports results for 7 different systems |
| 2,400 reports from INPC (1,400 laboratory reports and 800 narrative reports) | Number identified for removal, under-scrubbing (FN), over-scrubbing (FP) | Number of categories: 2<br>Examples: PHI and non-PHI |
| 7,193 surgical pathology reports<br>Discharge summaries<br>48 (BIDMS) 2,793 PHI<br>90 (actual PHI Partner's HealthCare)<br>889 discharge summaries (i2b2 de-id challenge) | Micro-average and category-wise P, R, F | Number of categories: 9<br>Examples: Age, Date, Doctor, Hospital, ID, Location, Patient, Phone, and non-PHI |
| A massive temporal ICU patient database (MIMIC II)<br>163 patients<br>2434 notes<br>1779 PHI | Micro-average and category-wise P, R, FN | Number of categories: 10<br>Examples: Patient Name, Patient Name Initial, Relative Name, Clinician Name, Date (non-year and year), Location, Phone, Age > 89, Undefined<br>Also reports results for non-critical vs. critical PHI |
| 100 pathology reports | Category-wise P, R, F<br>Overall accuracy | Number of categories: 6<br>Examples: Medical Record Number, Account Number, Age, Date, Name (begin), Name (intermediate) |
| 163 notes from a subset of PhysioNet<br>889 discharge summaries from i2b2 de-id challenge<br>(Training: 669, Testing: 220) | Micro-average and category-wise P, R, F, accuracy (token-level) | Number of categories: 8<br>Examples: Age, Date, Doctor, Hospital, ID, Location, Patient, Phone |

TABLE 1-continued

Summary of evaluation metrics in the medical text de-identification literature.

| Corpora and number of documents | Evaluation metrics | Comments |
| --- | --- | --- |
| Vanderbilt University Medical Center Records (VUMC) 500 patient files 889 discharge summaries (i2b2 de-id challenge) | Micro-average and category-wise P, R, F, accuracy, error (1 − accuracy) | Number of categories: 15 Examples: Name, Date, ID-num, Institution, Age, Pathnum, Place, Zipcode, Initials, Strt-addr, Room, Phone, Web-location, Device-id, Email Also reports results per document type |
| Primary care EMR records in EMRALD 700 notes from 7 clinics from Southern Ontario 500 notes from other geographic locations | Micro-average P, R, F, specificity, accuracy | |
| Training: 889 discharge summaries (i2b2 de-id challenge) Testing: 225 VHA clinical documents 5,416 PHI annotations | Micro-average, macro-average, and category-wise P, R, F1, F2 (Exact, partial, fully-contained matches) | Number of categories: 16 Examples: Patient Name, Relative Name, Healthcare Provider Name, Other Person Name, Street City, State Country, Deployment, ZIP Code, Healthcare Units, Other Organizations, Date, Age > 89, Phone Number, Electronic Address, SSN, Other ID Number |
| 3,503 clinical notes (22 note types) composed by Cincinnati Children's Hospital Medical Center clinicians; 889 discharge summaries (i2b2 de-id challenge), PhysioNet corpus 2483 nursing notes | Micro-average and category-wise P, R, F (entity-level and token-level) | Number of categories: 8 Age, Date, ID, Institution, Location, Name, Other, Phone Also reports results per document type |
| 889 discharge summaries (i2b2 de-id challenge) 800 VHA clinical documents (Training: 500, Testing: 300) | Micro-average, macro-average, and category-wise P, R, F1, F2 (entity-level and token-level) | Number of categories: 16 Examples: Patient Name, Relative Name, Healthcare Provider Name, Other Person Name, Street City, State Country, Deployment, ZIP Code, Healthcare Units, Other Organizations, Date, Age > 89, Phone Number, Electronic Address, SSN, Other ID Number |
| 889 discharge summaries (i2b2 de-id challenge) 1885 clinical notes from the MTSamples corpus 852 pathology and cytology reports | Macro-average and category-wise P, R, F, TP, FP, FN | Number of categories: 10 Examples: Date, Patient, Doctor, Name, Age, ID, Hospital, Location, Institution, phone, |
| Training: 521 narratives Validation and tuning: 269 narratives Testing: 514 narratives (i2b2/UTHealth 2014 challenge to identify PHI) | Micro-average and category-wise P, R, F (entity-level and token-level) | Number of categories: 25 Names (e.g., patient and doctor names), Profession, Locations (e.g., street, city, zip code, organizations), Contacts (e.g., phone, fax, email), IDs (e.g., medical record, identification number), Age and Dates |
| 1304 longitudinal medical records describing 296 patients Training: 790 records Testing: 514 records (i2b2/UTHealth 2014 challenge to identify PHI) | Micro-average, macro-average, and category-wise P, R, F (entity-level and token-level), strict matching and relaxed matching | Number of categories: 7 main categories, 25 sub-categories Names (e.g., patient name, doctor name, username, overall), Profession, Locations (e.g., hospital, street, city, zip code, organizations), Contacts (e.g., phone, fax, email), IDs (e.g., medical record, identification number), Age and Dates |

Embodiments in accordance with the present disclosure make the following assumptions in order to overcome limitations of the current evaluation approaches of the background art. First, embodiments assume that every document being analyzed pertains to an individual patient (i.e., there is a one-to-one mapping between documents and patients). Any document pertaining to multiple patients will be split into multiple documents. This assumption simplifies the embodiments without loss of generality. If a simple split is not possible (e.g., for a clinical study report from a clinical trial), then embodiments assume all information pertaining to an individual trial participant can be extracted as a unit and treated as a separate virtual document for the purposes of evaluation. This assumption also means that each patient has only one document in the corpus. For example, if the evaluation corpus consists of hospital discharge records, then each patient has a single discharge record. The implementation of this assumption need not actually be for the document combining all information for a given patient. However the computation should follow the same behaviors as if the document had been constructed to combine all information for the given patient.

Practically, the assumption of one document per patient may be implemented by determining and assigning each PII value in the corpus to the relevant patient. Each individual PII in the corpus can be traced to a particular patient and, for the purposes of risk measurement, all PII for each patient is grouped into information about that patient. A data structure capturing all information about a single patient is referred to as a patient profile. The patient profile contains all the PII information relevant to risk measurement, without any of the non-PII textual content.

Second, embodiments assume that if an annotation is not detected (i.e., leaked) then it can be used to re-identify a patient. So the probability of re-identifying a patient is conditional on the probability of a leak occurring. This can be expressed as given below in Equation (7).

$$Pr(reid, leak) = Pr(reid|leak) \times Pr(leak) \quad (7)$$

The probability of a leak in a set of documents is directly related to recall "r", given below in Equation (8).

$$Pr(leak) = 1 - r \quad (8)$$

If it is assumed that a single leak can be used to re-identify someone, then this assumption can be expressed as given below in Equation (9):

$$Pr(reid|leak) = 1 \quad (9)$$

Embodiments consider how much information needs to be leaked to re-identify a patient instead of applying a simplifying assumption that a single leak is sufficient for re-identification. A single leak for re-identification is conservative, which inflates the risk of re-identification.

Relatedly, if an annotation is detected, or "caught", then it is either redacted or re-synthesized. In this case, the probability of re-identifying a patient from that information is the same as completely random chance. However, if some of the information is generalized or retained (for example, retain the first 3 digits of zip code or retaining gender), then the caught PII still represents a risk of re-identification greater than random chance. Embodiments may formulate this probability as shown below in Equation (10a), wherein Pr(catch)=1−Pr(leak), which is recall.

$$Pr(reid, catch) = Pr(reid|catch) \times Pr(catch) \quad (10a)$$

Annotations that were leaked and annotations that were caught are mutually exclusive. The overall probability of re-identification is therefore given by Pr(reid, catch)+Pr(reid, leak), equivalent to Equation (10b):

$$Pr(reid) = (Pr(reid|catch) \times (1-Pr(leak))) + (Pr(reid|leak) \times Pr(leak)) \quad (10b)$$

Assuming Pr(reid|leak)=1, Equation (10b) simplifies to:

$$Pr(reid) = Pr(reid|catch) + (Pr(leak) \times (1-Pr(reid|catch))) \quad (10c)$$

Equation (10c) represents an overall probability of re-identification from annotations that were detected during information extraction and modified, and those that were leaked. Embodiments may assume Pr(reid|catch)=0, which will be valid in most cases where redaction or re-synthesis are used. For specific contexts in which generalization or other transformations are performed on the detected identifiers, such as for documents shared in the context of clinical trials transparency efforts, embodiments may assume Pr(reid|catch)>0.

Embodiments in accordance with the present disclosure consider two types of PHI annotations in text: direct identifiers and quasi-identifiers. Direct identifiers are annotations such as first name, last name, telephone numbers, unique identifiers (for example, medical record numbers (MRNs) and social security numbers (SSNs)), and email addresses. Quasi-identifiers are annotations that can indirectly identify the patients, such as dates, ZIP codes, city, state, and facility names. Direct and quasi-identifiers often are the types of data in health information that typically is targeted during the de-identification of health data. Embodiments distinguish between these two types of annotations because the manner in which they need to be evaluated will differ.

Because some embodiments focus on a unified system and method for measuring re-identification risk, recall is more relevant and precision is less important. Since embodiments do not consider precision any further, embodiments also do not consider the f-measure since it combines recall and precision. In the background art, a commonly used metric for evaluating the risk of re-identification is micro-average recall. Micro-average recall therefore is used herein as a baseline measure of re-identification risk.

The general approach of the background art does not account for some or all of the following: all-or-nothing recall, masking recall, one or more leaks of direct identifiers, the number of quasi-identifiers required for re-identification risk, re-synthesis recall and strict recall. The background art may address one of these issues, but does not account for all of them. Each of these will be addressed below.

Suppose an evaluation set of 100 clinical documents has 250 different instances of the last name of a patient. Then a micro-average recall would be computed across all of these 250 instances. If 230 of the instances were detected by the de-identification tool, then the recall would be 0.92, per Equation (3). Recall our simplifying assumption that one document is about one patient and each patient exists in only one document.

The micro-average does not account for the fact that there were 100 documents, and it does not account for how these names were distributed across these documents. This is important because for direct identifiers, the general assumption, based on the definition, is that a single instance of a direct identifier is sufficient to determine the identity of the patient. Although one can come up with counter-examples to this assumption (for example, the name "James" would not directly identify a unique patient because it is so common), it is one assumption commonly made in the disclosure control community and errs on the conservative side. The implication of this assumption is that embodiments will be conservative because any single leaked direct identifier is equated with a successful re-identification.

If a single instance of a direct identifier in a document could reveal the identity of a patient, then all that is needed to reveal the identity of a patient is for a single direct identifier to leak (or not to be detected) in a document. If a document has ten instances of a patient's Social Security Number (SSN) and nine of those instances are detected, from a re-identification risk perspective this is not a 90% recall but a 0% recall because there was a single leak. A recall measurement requiring all instances of value, which relate to single patient/unit/document, must be caught otherwise the recall=0% is referred to as the all-or-nothing recall. Another perspective on all-or-nothing recall is it is the percentage of units/documents/patients completely correctly detected.

Accurate determination of an all-or-nothing recall rate $r_i$ involves an evaluation corpus (i.e., a subset of the total set of documents), because the process requires human effort. Using a subset of the documents means the all-or-nothing recall is an estimate, with an associated confidence interval and distribution. Usually between about 100-1000 documents may be include in the evaluation corpus.

Furthermore, if the 230 names that were correctly detected were all the names in 80 documents, and the remaining 20 names that were not detected were in the other 20 documents (i.e., one name in each document), then the probability of determining the identity of the patient in these 20 documents is almost certain. The micro-average recall of 0.92 inflates the performance of the de-identification tool. The all-or-nothing recall in this case is 0.8, and the correct probability of re-identifying an individual in these documents is then 0.2 instead of 0.08.

Therefore, for direct identifiers it is important to use the all-or-nothing recall value rather than the micro-average recall value.

Regarding masking recall, suppose that during information extraction a particular type of annotation is detected. For example, if there is a "James" in the document then it is identified and then classified as a "First Name". If both of these steps (identification and classification) are true, then this is typically considered a true positive. However, from a de-identification/recall perspective it does not matter whether "James" is classified as a first name or a last name, or even as a ZIP code. All that matters is that it has been detected. Of course, the classification as a first name may matter from a precision perspective, but it does not matter from a recall perspective.

Table 2A illustrates an example of a mismatch between expert annotation and the classification by a de-identification tool. In Table 2A, annotation provided manually by an expert does not match what a de-identification tool determined. However, in a redacted document the net effect is the same, i.e., the name of the facility will be protected. All the identifying information is removed. Therefore, a more precise recall would consider the organization completely masked, even though it is masked by several annotations of different types.

TABLE 2A

| Expert Annotation | [ORG]Thompson's Ohio Children's Hospital[/ORG] |
|---|---|
| De-identification Tool | [NAME]Thompson's[/NAME] [STATE]Ohio[/STATE] [ORG]Children's Hospital[/ORG] |

Therefore, embodiments consider masking recall to be a recall value calculated only based on whether a particular direct or quasi-identifier in the text has been detected or not. Masking recall should use a token level evaluation: evaluate that each token is masked.

Consider Table 2B, which shows a comparison of masking recall and conventional recall for different annotation types in a dataset originating from the Informatics for Integrating Biology and the Bedside ("i2b2") 2014 UTHealth challenge. For all annotation types, masking recall is markedly higher than the conventional recall. A question from the de-identification perspective is whether embodiments missed a PHI or not. The masking recall more clearly answers this question, as it indicates the extent to which instances of an annotation type were identified as PHI. For example, among all IDs, 83.96% of them were identified as a PHI of some annotation type.

TABLE 2B

Comparison of masking recall and conventional recall on i2b2 data.

|  | ID | Names | Organizations | All Quasi-identifiers |
|---|---|---|---|---|
| Masking Recall | 0.8396 | 0.7909 | 0.4517 | 0.847 |
| Conventional Recall | 0.7796 | 0.7892 | 0.3820 | 0.1649 |

However, a token level evaluation would be problematic if the frequencies of tokens in the data set are not similar. For example, consider a data set with 1000 documents such that 1000 documents have a first name, and only 10 have a last name. The de-identification tool detected the first names in 999 of the 1000 documents and only 2 of the last names. If both names are pooled as suggested above (e.g., Micro-average) the recall would be 1001/1010=0.99. This, however completely hides the very low recall on last names because of the extreme imbalance in the frequency of occurrence of each name. Therefore, the concept of masking recall is appropriate only if the frequencies of all of the direct and quasi-identifiers is more-or-less the same in the data set. In practice, this cannot be ensured, and therefore embodiments need a more robust approach for evaluation that does not depend on micro-averaging. Instead, the more robust approach must consider frequencies of direct-identifiers.

Regarding one or more leaks of direct identifiers, suppose as noted earlier for direct identifiers, it was assumed that a leak of a single value in a document would result in the patient being re-identified. To be precise, embodiments are concerned about at least one of the direct identifiers leaking from the de-identification process. Embodiments evaluate this in a manner that accounts for the different frequencies of different types of identifiers. Let $s_i$ be the number of documents that a particular identifier "i" appears in, and "n" is the total number of documents. Then embodiments may define the probability that a direct identifier is missed or leaks given that it actually appears in the corpus being evaluated as given by Equation (11) below.

$$Pr(\text{leak,appears}) = Pr(\text{leak}|\text{appears}) \times Pr(\text{appears}) \quad (11)$$

Equation (11) gives the probability that a leak will occur given that the identifier actually appears in the data. The probability that direct identifier "i" leaks and appears in a document is given by Equation (12) below.

$$w_i(1 - r_i) \quad (12)$$

where $w_i = s_i/n$, and $r_i$ is the all-or-nothing recall. Assuming each direct identifier is independent and uncorrelated from other direct identifiers, a probability that a document will leak at least one direct identifier is given by Equation (13) below.

$$1 - \prod_i (1 - w_i(1 - r_i)) \quad (13)$$

This gives the combined probability of a leak for all direct identifiers. Since each direct identifier type is dealt with independently, the frequency with which specific direct identifiers appear in the data set will not affect this calculation directly, except when computing the confidence intervals.

Regarding quasi-identifier risk, a single value of a quasi-identifier is not necessarily uniquely identifying. However, in some geographic areas, two quasi-identifiers such as the date of birth and the ZIP or postal code are unique across most of the population. For example, that uniqueness approaches 100% in Canada and the Netherlands, and is close to 63% in the US. Therefore, embodiments make a conservative assumption that at least two quasi-identifiers must leak in the same document to re-identify a patient.

Let "m" be the average number of times that a quasi-identifier value in a document is repeated per document (i.e., the average number of instances per quasi-identifier value). Also, let "$r_q$" be the micro-average recall computed across all quasi-identifiers. Then the probability of at least one quasi-identifier instance being leaked would be given by $1-(r_q)^m$. This means that the more instances that a quasi-identifier has in a document, the greater the likelihood that there will be a leak.

Finally, let "$n_q$" be the average number of distinct quasi-identifier values per document. Since it is not known which two or more quasi-identifiers will be leaked, embodiments need to account for all combinations of two or more leaks. This can be represented as a binomial distribution with $n_q$ trials as shown below in Equation (14), where B(a,b) is a binomial distribution with "a" trials and "b" probability of success. The values for m and $n_q$ are computed from the data.

$$Pr(X \geq 2) \text{ for } X \sim B(n_q, 1-(r_q)^m) \qquad (14)$$

Equation (14) assumes that the instances for the same quasi-identifier are protected independently. In practice, this is a conservative assumption since the ability to detect one instance of a quasi-identifier could be quite similar across all instances of that quasi-identifier in a document. For example, the recall for a date of birth will be the same for all instances of date of birth. A less conservative approach for modeling of at least two quasi-identifiers leaking would then be $Pr(X \geq 2)$ for $X \sim B(n_q, 1-r_q)$. Embodiments may be conservative because the recall will also depend on the context in which a quasi-identifier is used and how it is expressed, and that will not necessarily be the same across all instances. For example, the name of a facility may be "The Ottawa Hospital", "TOH", and "the hospital in Ottawa" and all of these instances refer to the same quasi-identifier but would have different recall rates.

In the i2b2 data set using an out-of-the-box (not tuned) detection system, the proportion of documents with at least two leaked quasi-identifiers was about 0.3704, and the probability as expressed in equation (14) was about 0.467. Therefore Equation (14) sets an upper bound on the risk, and errs on the conservative side.

Given the calculations above of re-identification risk, the data set (or a subset of interest of the data set) may be perturbed (e.g., changing direct identifiers or quasi-identifiers) if the risk of re-identification exceeds a predetermined threshold. The goal of perturbing the data is to introduce "noise" into the data in order to reduce a risk that re-identification can take place using the noisy data. Regarding re-synthesis recall, it is common practice to replace the elements in text that are annotated by the de-identification tool as direct or quasi-identifiers with fake values. The fake values would be randomly generated values that are substituted for the original values. Such a re-synthesis of the original text, known as "hiding in plain sight", helps ensure that the de-identified text looks realistic.

It has been shown that an adversary who attempts to re-identify individuals from a re-synthesized document has difficulty in determining which identifiers are re-synthesized ones versus original ones that were missed by the de-identification tool. For example, if the de-identified text has the names "James" and "Alan" in the document, there will be uncertainty as to which one of these is the real name of the patient. For this reason, re-synthesis allows leaks to be hiding in plain sight.

Let "h" be the probability that an adversary can correctly determine whether an identifier is an original one that was leaked versus a re-synthesized one, then the probability of re-identification for a direct identifier is given below in Equation (15).

$$Pr(\text{recognize, leak, appears}) = Pr(\text{recognize}|\text{leak, appears}) \times Pr(\text{leak}|\text{appears}) \times Pr(\text{appears}) \qquad (15)$$

Equation (15) gives the probability that a document will leak at least one direct identifier that is recognized by an adversary. Equation (15) can be computed as given below in Equation (16), where "$r_i$" is the all-or-nothing recall for direct identifiers.

$$1 - \prod_i (1 - h \times w_i(1 - r_i)) \qquad (16)$$

For quasi-identifiers, the probability is:

$$Pr(X \geq 2) \text{ for } X \sim B(n_q, h(1-(r_q)^m)) \qquad (17)$$

Based on previous experiments, a reasonable value can be computed as h=0.1, which also errs on a more conservative side given that some studies found that h=0.

Equation (16) may result in relatively small values of recall giving seemingly acceptable levels of re-identification probability. For example, using h=0.1, $w_i$=1, and $r_i$=0.4 gives an overall probability of re-identification with re-synthesis of 0.06, even though the value of $r_i$ is relatively low. Furthermore, with a low value for $r_i$, the density of identifiers that have leaked will be relatively high and it is not clear that the h value from previous studies would still be valid. Therefore, embodiments use a minimum value for the recall values in order to use the re-synthesis adjustment. This adjusts Equation (16) to account for "hiding in plain sight" for those recall values above 0.9, versus those below 0.9 where it would not be applicable. The risk of re-identification based on direct identifiers while considering the effect of "hiding in plain" is given below in Equation (18).

$$1 - \prod_{\{i|r_i \geq 0.9\}} (1 - h \times w_i(1-r_i)) \prod_{\{i|r_i < 0.9\}} (1 - w_i(1-r_i)) \qquad (18)$$

Equation 18 gives a probability of re-identification given attempt for DIs (i.e., Pr(recognize, leak, appears) or Pr(recognize, leak, appears|attempt). Embodiments assume that a relatively high recall of 0.9 for direct identifiers may be necessary for the published h value to hold. Embodiments may use a slightly lower cutoff value than is reported in the literature because the literature uses micro-average recall all the time rather than all-or-nothing, and this will result in inflated recall values. Therefore, the lower threshold used by embodiments adjusts for that. The value 0.9 may be deemed to be an upper limit on recall when applying "hiding in plain sight". However, in some embodiments the upper limit on recall is a variable whose value may change based on a rate at which adversaries are able to identify leaks in resynthesized data.

Note the impact of w, the probability a direct identifier appears in a document, will have on the overall risk from direct identifiers. On the one hand, w<1 will decrease risk, possibly even countering for the loss of the factor h=0.1 when recall is below 0.9. On the other hand, w will increase variance for recall, which depends on $s_i = n^* w_i$, in which $s_i$ represents the number of documents with identifier "i." In order to justify the use of the factor h, embodiments ensure r is significantly greater than or equal to 0.9 with direct-identifiers, as discussed elsewhere in this specification. An expression for quasi-identifiers is given below in Equations (19a)-(19b).

$$Pr(X \geq 2 \text{ if } r_q \geq 0.7, \text{ or } Y \geq 2 \text{ if } r_q < 0.7) \qquad (19a)$$

$$\text{for } X \sim B(n_q, h(1-(r_q)^m)), Y \sim B(n_q, (1-(r_q)^m)) \qquad (19b)$$

The minimum recall value in Equations (19a)-(19b) for the application of "Hiding in Plain Sight", use the factor 0.7. This is the value that embodiments use based on experience (e.g., judgment) and what would be acceptable for "Hiding in Plain Sight" to be effective for quasi-identifiers. The minimum recall value may be adjusted by an analyst. The value 0.7 is used in this example. However, in other embodiments the value of "h" is a variable whose value may change based on whether adversaries are able to find leaked data in resynthesized data.

If a de-identified text document will be disclosed publicly, then the results in Equations (18) and (19a)-(19b) are correct. However, for non-public data releases, it is necessary to take into account a probability that an adversary will attempt to re-identify an individual in the data set. Consideration of the probability of attempt is part of common disclosure control practice for health data, and has been included in recent guidance and standards. The probability of attempt may be modeled as shown below in Equations (20a)-(20b) for direct identifiers, showing a probabilistic modeling of release context. Equations (20a)-(20b) use variables as pointwise values to calculate Pr(attempt) for DIs.

$$Pr(\text{reid, attempt, leak, appears}) = \quad (20a)$$

$$\left(1 - \prod_{\{i|r_i \geq 0.9\}} (1 - h \times w_i(1-r_i)) \prod_{\{i|r_i < 0.9\}} (1 - w_i(1-r_i))\right) \times Pr(\text{attempt}) \quad (20b)$$

An expression for quasi-identifiers is given below in Equations (21a)-(21b).

$$Pr(\text{reid,attempt,leak,appears}) = Pr(X \geq 2 \text{ if } r_q \geq 0.7, \text{ or } Y \geq 2 \text{ if } r_q < 0.7) \times Pr(\text{attempt}) \quad (21a)$$

$$\text{for } X \sim B(n_q, h(1-(r_q)^m)), Y \sim B(n_q, (1-(r_q)^m)) \quad (21b)$$

A method based on subjective probability to evaluate the probability of re-identification for health data has been developed for computing a value for Pr(attempt). The method uses checklists to evaluate security and privacy practices of the data recipient, types of contractual controls in place, and motives, technical, and financial capacity of the data recipient to re-identify the data set. How Pr(attempt) is calculated depends upon analysis of the release context.

The background art assumes that the computed recall value is an accurate point estimate, and typically no confidence interval has been computed. However, because during validation studies the computed value is an estimate of recall, it is important to report the confidence interval around that estimate as well. The confidence interval may be affected by, e.g., the sample size of the corpus and the frequency of identifiers in the data.

Therefore, the recall may be represented by a normal distribution with the observed value as the mean. An estimate of the variance for direct identifiers may be $r_i(1-r_i)/s_i$. Similarly, the weight $w_i$ may be represented by a normal distribution with the observed value as the mean, and an estimate of the variance may be $w_i(1-w_i)/n$. An estimate of the variance for quasi identifiers may be expressed as $r_i(1-r_i)/z$, where z is the number quasi-identifier annotations in an associated gold standard.

Because each identifier may have a different frequency in the data, computations of recall may have different accuracies, and embodiments account for the different accuracies. For example, a direct identifier that appears in 1000 documents will have a recall value that is computed more accurately after evaluation than a direct identifier that appears in only 10 documents. Embodiments account for this uncertainty.

Document frequency and all-or-nothing recall may be treated as proportion estimates. Document frequency may be an estimated proportion of documents with a particular type of PHI, and all-or-nothing recall may be an estimated proportion of documents correctly annotated. Proportion estimates follow a binomial distribution since they are modeled as Bernoulli trials. However, it is common practice to approximate proportion estimates with a normal distribution.

Embodiments may use a binomial distribution to predict a rate of two leaks occurring in a single document. For example, embodiments counted the number of documents in the i2b2 corpus that had at least two leaked Qis (see the third row of Table 2C, below). As discussed above, a minimum of two leaked QIs are needed to re-identify a data subject. Table 2C illustrates a predicted number of leaks based on embodiments described herein. The estimate is slightly conservative, predicting slightly more leaks than were actually measured. Table 2C also lists "1 minus micro-average" and "1 minus micro-average, squared" as baseline methods for predicting the rate at which two QI values in the same document are leaked. In contrast, optimistic values of the background art can mislead that a dataset is low risk when it is not. Conservative values provide an upper bound on the risk.

TABLE 2C

Comparison of predicted and measured rate of Two QIs leaking

|  | 2 QI leak rate |
| --- | --- |
| 1 − Micro-Average Recall | 0.1529 |
| 1 − (Micro-Average Recall)$^2$ | 0.2824 |
| Percentage of documents with at least two leaked QIs | 0.3704 |
| Predicted Leak rate (per embodiments in accordance with the present disclosure) | 0.4670 |

A value of Pr(attempt) also may be represented as a triangular distribution, which is an approach to represent uncertainty with subjective probabilities. The counts "$n_q$" and "m" may be represented as having Poisson distributions given that there will be variation in their values across documents as well.

Variable weight and recall values may be represented as normal distributions denoted by N(a, b), where "a" is the mean and "b" is the standard deviation. The triangular distribution is given by Triag(a, b, c), where b is the most likely value, and a and c are the minimum and maximum values. Therefore, the overall probability distribution for direct identifiers can then formulated as shown below in Equations (22a)-(22b). $R_i$ and $W_i$ are probability distributions of the respective point estimates $r_i$ and $w_i$.

$$Pr(\text{reid, attempt, leak, appears}) = \quad (22a)$$

$$\left(1 - \prod_{\{i|r_i \geq 0.9\}} (1 - h \times W_i(1-R_i)) \prod_{\{i|r_i < 0.9\}} (1 - W_i(1-R_i))\right) \times A$$

$$\text{for } W_i \sim N(w_i, \sqrt{w_i(1-w_i)/n}), \quad (22b)$$

$$R_i \sim N(r_i, \sqrt{r_i(1-r_i)/s_i}), A \sim Triag(a, b, c)$$

A similar expression for quasi-identifiers is given below in Equations (23a)-(23c).

$$Pr(\text{reid,attempt,leak,appears}) = Pr(X \geq 2 \text{ if } r_q \geq 0.7, \text{ or } Y \geq 2 \text{ if } r_q < 0.7) \times A \quad (23a)$$

$$\text{for } X \sim B(N_q, h(1-(R_q)^M)), Y \sim B(N_q,(1-(R_q)^M)), A \sim \text{Triag}(a,b,c) \quad (23b)$$

$$\text{where } R_q \sim N(r_q, \sqrt{r_q(1-r_q)/z}), N_q \sim \text{Pois}(n_q), M \sim \text{Pois}(m) \quad (23c)$$

The distribution of terms in equations (22)-(23) may be computed using a Monte Carlo simulation and the 95% confidence interval for the overall probability of re-identification derived from that empirical distribution. Equations (22a)-(22b) use probability distributions for values and account for Pr(attempt) for DIs. Use of the distributions is what enables embodiments to use a Monte Carlo simulation and compute confidence intervals.

The re-identification probability distribution may be evaluated by comparing the distribution to an appropriate threshold for each of the direct and quasi-identifiers. For direct identifiers, embodiments in accordance with the present disclosure may create a benchmark or a threshold distribution and compare the actual distribution obtained from the data being evaluated for risk of re-identification with the threshold distribution. If the actual distribution does not cover a risk greater than what is covered by the threshold distribution, then embodiments have sufficient evidence to conclude or infer that the actual risk is the same as or lower than the threshold risk, and is therefore considered to be acceptably low.

FIG. 1A illustrates a circumstance 100 for which an actual risk 101 is the same as or less than a benchmark threshold risk 110. In FIG. 1A, an upper confidence limit 103 of the actual distribution is less than or equal to an upper confidence limit 113 of the benchmark threshold distribution. If this relationship between confidence limits were not true, embodiments may not be able to conclude that the actual risk 101 is lower than the benchmark threshold distribution 110, or that the actual risk is acceptably low.

FIG. 1B illustrates a circumstance 150 for which an upper confidence limit 153 of the actual distribution goes above an upper confidence limit 163 of the benchmark distribution 160, and therefore embodiments cannot conclude that the actual risk 150 is less than or equal to the benchmark distribution 160. This can be thought of in terms of a null hypothesis where the actual risk is greater than the benchmark distribution 160. In FIG. 1A embodiments can reject the null hypothesis and conclude that the actual risk is not greater than the threshold distribution, but in FIG. 1B there is insufficient evidence to reject the null hypothesis, and embodiments conclude that the actual risk may be greater than the threshold distribution.

For a benchmark distribution, an acceptable recall for direct identifiers needs to be determined that would result in a measure of risk equivalent to existing standards or benchmarks. Embodiments may compute the benchmarks. At least some of the background art discloses a recall of at least 0.95 for direct identifiers. Embodiments have extended this criterion to all-or-nothing recall, which is more conservative than that background art had intended since the background art refers to micro-average recall.

When constructing the benchmark distribution, embodiments assume w=1, which is worst case in terms of risk because this value assumes that all of the direct identifiers are present in each document. From Table 1, it is evident that the smallest data set used to evaluate a rule-based de-identification tool or the testing data set for a machine-learning based tool was 220 documents. Therefore, when evaluating performance of various embodiments, it is assumed that n=220 for a benchmark distribution.

Evaluating Equation (22a)-(22b) with these values for w and n provides a conservative benchmark probability distribution that reflects what has been considered in the past to be acceptable performance for detection and removal of direct identifiers. Test cases of embodiments use this result as a benchmark distribution. A data set of n<220 would result in an actual confidence interval wider than the benchmark distribution, thus increasing a chance that the actual risk may cover a risk that is greater than the benchmark distribution. Therefore, test cases do not set minimal data set sizes when evaluating various embodiments, because it already has been accounted for.

When w<1, an overall risk from direct identifiers will decrease, but this will also increase variability because recall depends on $s_i = n^* w_i$. In this case, an actual distribution may cover a risk that is greater than the benchmark distribution, and embodiments are not able to calculate, infer or conclude that the risk is acceptably low.

Given a conservative benchmark distribution, embodiments can perform the comparisons illustrated in FIGS. 1A-1B to determine if the actual distribution covers a risk greater than the benchmark, and therefore to calculate, infer or conclude whether the actual re-identification risk is acceptable.

Regarding evaluation of the distribution for quasi-identifiers, the background art discloses usage of a fixed 85% recall threshold of quasi-identifiers for automated de-identification. However, a drawback of a fixed value for quasi-identifiers is that a fixed value is inconsistent with how the re-identification risk from quasi-identifiers in structured data sets are evaluated, as discussed below in further detail.

Embodiments determine a benchmark for acceptable probability of re-identification by a threshold computed from sensitivity of the data, potential subjective and objective harm that can affect a patient if there was an inappropriate disclosure of their data or re-identification, and an extent to which the patient had consented to usage of their information for secondary purposes. These criteria also are used to determine an acceptable probability of re-identification for quasi-identifiers in structured data sets. For example, sensitivity of the data may refer to personal sensitivity of the data (e.g., if it reveals psychotherapy information or sexual orientation). Objective harm may include situations that may expose a patient to legal action (e.g., medical evidence of drug usage) or affect insurance coverage (e.g., existence of a genetic predisposition to cancer).

The background art provides examples of acceptable probability values for the evaluation criteria. Data custodians of the background art have used the "cell size of five" rule as a threshold for deciding whether data has a low risk of re-identification. This rule has been applied originally to count data in tables. However, count data may be converted easily to individual-level data, so count data and individual-level data are essentially equivalent. A minimum "cell size of five" rule would translate into a maximum probability of re-identifying a single record of 0.2. Some data custodians use a cell size of three, which is equivalent to a probability of re-identifying a single record of 0.33. For the public release of data, a cell size of 11 has been used in the US, and a cell size of 20 for public Canadian and U.S. patient data. Cell sizes from 5 to 30 have been used across the US to protect students' personally identifying information. Other cell sizes such as 4, 6, 10, 16, and 20 have been used in different scenarios within varying countries.

Once an appropriate value is determined from within this range using the three criteria and the checklist and scoring scheme, the inequality in Equations (24a)-(24c) below may be derived.

$$Pr(X \geq 2 \text{ if } r_q \geq 0.7, \text{ or } Y \geq 2 \text{ if } r_q < 0.7) \times A \leq \tau \quad (24a)$$

$$\text{for } X \sim B(N_q, h(1-(R_q)^M)), Y \sim B(N_q, (1-(R_q)^M)), A \sim \text{Triag}(a,b,c) \quad (24b)$$

$$\text{where } R_q \sim N(r_q, \sqrt{r_q(1-r_q)/z}), N_q \sim \text{Pois}(n_q), M \sim \text{Pois}(m) \quad (24c)$$

In Equation (24a), $\tau$ is a threshold probability. If the inequality of Eq. (24a) is met then the risk of re-identification is considered acceptable. The upper confidence limit of the 95% confidence interval should be below a predetermined threshold value to be able to conclude that the risk is acceptably small.

The upper bound of the 95% confidence interval for $R_q$ represents the risk of re-identification given leak, or Risk (X|leak).

Now the combined risk must be computed using the expression: combined_risk(X)=Risk(X|catch)+Risk (X|leak).

Risk(X|catch) is computed on a structured data set, and is a structured dataset risk of re-identification, for a technique such as k-anonymity or the KERMIT process. The structured data may be formed from the QIs extracted from the text corpus, or it may be an external structured dataset that already contained all of the same information, and sometimes more information.

By adding these two risks together, a final combined risk of re-identification based on both leak and catch is determined. The final combined risk for QIs must be below a predetermined threshold. The threshold is determined using a questionnaire presented elsewhere.

Alternative Integrated Approach to Leak and Catch QI Risk Measurement:

The combined risk includes the risk of re-identification from catching data and leaking data. Each of these risks refers to mutually exclusive events (i.e., caught and leaked), and embodiments model the risk presented from each possibility. Some embodiments may model the combined risk in a more granular manner, by computing separate re-identification risks from all combinations of possible leaks and catches in the documents. An expression for a combined risk for two PII values, A and B, was given above in Equation (2).

For risk measurement to be practical, a single risk should be computed for each possible combination of leak and catch. To accomplish this, embodiments use a KERMIT process to measure a risk on the caught and leaked PII. The KERMIT process quantifies information in bits (per Shannon's information theory) for each value present in a patient profile, including the structured representation of QIs relating to a patient. Each patient then may have their risk of re-identification computed.

Using a KERMIT process, embodiments may quantify the information in a leaked value as the equivalent to the information in an untransformed value. Thus, embodiments may apply a risk measurement based on an untransformed value. This approach, while computational more complex, has an advantage of quantifying and validating whether a particular leak or combination of leaks is actually identifying. For example, leaking value A may have very little impact on the risk, while value B may increase the risk significantly, contrary to an assumption that at least two leaks is necessary information for re-identification.

For each patient, let "Q" be a set of all QIs associated with that patient. Embodiments compute a set "S" of all possible scenarios of leaking and catching the QIs in "Q". Let "$L_i$" be the set of leaked QIs for scenario i. Let "$C_i$" be the set of leaked QIs for scenario i. For each scenario, embodiments compute a risk of re-identification, then weight the re-id risk by a probability of leaking and then account for the release context, in concordance with the relationship of Equation (25) below.

$$\text{Risk} = pr(\text{attempt}) * \sum_{i \in S} l^{|L_i|}(1-l)^{|C_i|}\text{Risk}(L_i C_i) \quad (25)$$

The number of combinations of leak scenarios that require measurement is specific to each patient profile, and is based on the number of QIs in each patient profile. The KERMIT process provides efficient implementation because most of the evaluation may be cached and reused. Furthermore, if the list of scenarios is ordered by increasing risk, then any scenarios after a risk of 1.0 will definitely have a risk of 1.0. Using this technique, embodiments may prune the scenarios and reduce the computation.

Embodiments may extend Equation (25) to be more precise, by measuring a leak rate per PII type. For example, the leak rate for dates might be 0.1% while the leak rate for medical history might be 3%. The for each QI in L, embodiments may obtain a type-specific or value-specific leak rate "$l_{type}$" and compute a leak rate (i.e., a probability of leaking) for this set of values. Equation (26) below takes into account these more granular leak rates:

$$\text{Risk} = pr(\text{attempt}) * \sum_{i \in S} \prod_{j=0}^{|L_i|} l_j \prod_{k=0}^{|C_i|} (1-l_k)\text{Risk}(L_i C_i) \quad (26)$$

Since the KERMIT process computes a risk of re-identification per patient, the risk must be aggregated across all patients. The aggregation of risk across patients, as discussed in greater detail elsewhere herein, may be summarized as: for private releases, this aggregation is an average risk across all patients, and for public releases it is the maximum risk across all patients. Thus, an average risk for the dataset can be expressed in accordance with Equation (27):

$$\text{Risk} = \frac{1}{n}\sum_{i=0}^{n} \text{Risk}_i \quad (27)$$

Illustrative Example DI

In this section, computation of a probability of re-identification is illustrated. Embodiments address direct identifiers and quasi-identifiers separately. The illustrations assume the context is a data release to a researcher affiliated with an academic hospital. The researcher may have implemented somewhat strong security and privacy controls and may have agreed to refrain from attempts at re-identification.

Suppose there are 100 documents in a data set (i.e., n=100), and that an analyst is interested in only two direct identifiers, a last name and an email address. This example may refer to the terms listed below in Table 3.

TABLE 3

Variables for the Illustrative Example

| | |
|---|---|
| $s_i$ | The number of documents that a particular direct identifier i appears in |
| $s_L$ and $s_E$ | The number of documents with Last names and Email address respectively |
| $r_i$ | The all-or-nothing recall for direct identifier "i" |
| $r_L$ and $r_E$ | all-or-nothing recall for Last names and Email address respectively |
| n = 100 | The number of documents |
| $w_i = s_i/n$ | Document frequency of QI "i" |
| $w_L = s_L/100$ and $w_E = s_E/100$ | Document frequency of last name and email address, respectively |

If it is assumed that $r_L \geq 0.9$ and $r_E \geq 0.9$ and that resynthesis was applied, then a probability of re-identification from equations (22a), (22b) is given below in Equation (28).

$$Pr(\text{reid,attempt,leak,appears}) = 1 - (1 - 0.1 w_L(1-r_L))(1 - 0.1 w_E(1-r_E)) \times Pr(\text{attempt}) \quad (28)$$

The value of Pr(attempt) was computed to be 0.3 for this particular example data release using the detailed checklist and scoring scheme described elsewhere. This can be represented as a triangular distribution with parameters Triag (0.2, 0.3, 0.4). Embodiments then model the variability in the overall probability of re-identification as given below in Equations (29a)-(29b).

$$Pr(\text{reid,attempt,leak,appears}) = 1 - (1 - 0.1 W_L(1-R_L))(1 - 0.1 W_E(1-R_E)) \times A \quad (29a)$$

$$\text{for } W_i \sim N(w_i, \sqrt{w_i(1-w_i)/100}), R_i \sim N(r_i, \sqrt{r_i(1-r_i)/s_i}), A \sim \text{Triag}(0.2,0.3,0.4), i \in \{L,E\} \quad (29b)$$

An empirical distribution can be derived for Equations (22a), (22b) using a Monte Carlo simulation. Once an empirical distribution is derived, the $2.5^{th}$ and $97.5^{th}$ percentiles can be used to compute the 95% confidence interval.

Similarly, the benchmark distribution can be computed by setting the weight to one and the recall for every direct-identifier (DI) to 0.95 as shown below in Equations (30)-(30b).

$$Pr(\text{reid,attempt,leak,appears}) = 1-(1-0.1(1-R_L))(1-0.1(1-R_E)) \times A \quad (30a)$$

$$\text{for } R_L \sim N(0.95, \sqrt{0.0475/s_L}), R_E \sim N(0.95, \sqrt{0.0475/s_E}), A \sim \text{Triag}(0.2,0.3,0.4) \quad (30b)$$

The upper bound of the 95% confidence interval for the probability of re-identification (i.e., re-id risk) is then compared against the upper bound of the 95% confidence interval for the benchmark. If the upper bound of the risk is below the upper bound of the benchmark, then the DI risk is deemed acceptable.

Illustrative Example QI

Regarding quasi-identifiers, let "$r_q$" be a micro-average recall computed across all quasi-identifiers. Variables in lowercase (eg. $r_q$) are pointwise values, such a recall, while uppercase variables such as $R_q$ are distributions that use a normal distribution to represent a probable value (e.g., a probable recall value). As shown in Equation (31b), $N_q$ and M are modeled with Poisson distributions. The parameters "m" and "$n_q$" are descriptive count statistics computed from the data set itself, and represented by a Poisson distribution. If it is assumed that $r_q \geq 0.7$, then an empirical distribution of the probability of re-identification for quasi-identifiers, using the same logic as for direct identifiers, may be derived from a Monte Carlo simulation as given below in Equations (31a)-(31b).

$$Pr(X \geq 2) \times A \text{ for } X \sim B(N_q, 0.1(1-(R_q)^M)) \quad (31a)$$

$$R_q \sim N(r_q, \sqrt{r_q(1-r_q)/100}), N_q \sim \text{Pois}(n_q), M \sim \text{Pois}(m), A \sim \text{Triag}(0.2,0.3,0.4) \quad (31b)$$

Appropriate percentiles may be used to compute the 95% confidence interval from empirical distributions.

The upper bound of the 95% confidence interval is used to model the probability of re-identification (i.e., re-id risk) given the occurrence of a leak (i.e., Risk(X|leak)).

Next embodiments may compute a risk of re-identification on a structured dataset representing the data in the text corpus. This data may be a structured version of the PHI found in the corpus, or may be a separate structured representation of the same unstructured (e.g., text) data. Embodiments use methods such as K-anonymity or the KERMIT process to measure the risk of re-identification the structured data, and this is referred to as Risk(X|catch).

Embodiments then may compute the combined risk of all QIs caught and leaked in accordance with Equation (32):

$$\text{combined\_risk}(X) = \text{Risk}(X|\text{catch}) + \text{Risk}(X|\text{leak}) \quad (32)$$

Illustrative Example QI Alternative

Alternatively, embodiments may use a more granular approach to this process that accounts for substantially all possible scenarios of leak and catch. Let "$r_q$" be a computed micro-average recall for QIs. If $r_q \geq 0.7$ and resynthesis is applied, then HIPS can be applied. Then a recognizable leak rate "l" to account for HIPS in accordance with Equation (33):

$$l = (1 - r_q) \times h \quad (33)$$

For each patient there exists a set "Q" of QIs representing all the QIs associated with that patient. Embodiments compute substantially all possible scenarios of leaking and catching the QIs in "Q"; let the set of scenarios be "S". Let "$L_i$" be the set of leaked QIs for scenario i. Let "$C_i$" be the set of leaked QIs for scenario i. For each scenario, embodiments compute a risk of re-identification, then weight it by the possibility of leaking and then account for the release context in accordance with Equation (34).

$$\text{Risk} = pr(\text{attempt}) * \sum_{i \in S} l^{|L_i|}(1-l)^{|C_i|}\text{Risk}(L_iC_i) \quad (34)$$

Assuming this scenario is a private release, embodiments average the risk across all patients, and this averaged risk represents the combined risk.

Test Case:

Empirical application of the evaluation system and method has been used to illustrate its use on a real data set, and to show how to interpret the results. Embodiments have been applied to a test data set from the University of Michigan Medical School. The test data comes in four groups, one is a random assortment of documents from the full collection of over 80 million, while the other three are a stratified random sample of three documents types: Social Work Notes, History and Physical Notes, and Progress Notes.

Each document is between 1-2 pages in length and has different emphasis that is evident in the content and organization of the document. The random group allows us to analyze each stratum against a general representation of the overall corpus.

There are 30 documents in each group for a total of 120 expert annotated documents. The entire corpus was annotated by a single expert, and subsequently reviewed by a second expert. Where there was disagreement the two experts met and reached consensus on the appropriate annotation to use.

De-identification in the test case was performed with a rule-based engine known in the art. Because this was a rule-based de-identification engine, no training data set was required to construct a model before applying it. The de-identification engine was applied "out-of-the-box" without modification or customization.

The set of direct and quasi-identifiers that were targeted for extraction in these documents are consistent with those known in the background art. These include: IDs, phone numbers, people names, email addresses, street addresses, organization names, ZIP codes, ages, country, state, and city.

Risk assessment results from the test case have been compared to results that would be obtained using a typical contemporary micro-average evaluation of recall. The comparison illustrates a difference between the proposed evaluation system and method and the background art.

Regarding risk thresholds, the case study uses a threshold based on a commonly used "cell size of five" rule, which is equivalent to a probability of re-identification of 0.2 for quasi-identifiers. The upper confidence limit of the quasi-identifier confidence interval should be below that value. For direct identifiers, a data confidence interval is compared with the benchmark confidence interval of the background art.

Table 4 shows information about the test corpus used in the case study. Table 4 contains information on the data element type (e.g., annotation) frequency by document, and the number of instances of annotations found in the corpus. Table 4 refers to particular annotation sets: the gold standard, which was expertly annotated and reviewed. The document columns indicate the number of documents containing that annotation, while the annotations columns represent the number instances (i.e., individual annotations).

TABLE 4

Number of annotations in the evaluation corpus.

|  | #Documents | #Annotations |
| --- | --- | --- |
| ID | 105 | 438 |
| Phone Number | 34 | 78 |
| Street Name | 10 | 14 |
| Names (first, last, middle) | 118 | 1332 |
| Dates | 111 | 703 |
| Organizations | 50 | 110 |
| Age | 2 | 3 |
| ZIP Code | 9 | 13 |
| Country | 2 | 3 |
| State | 32 | 47 |
| City | 43 | 78 |

Table 5 shows a summary of results that would be obtained by a more traditional micro-average recall calculation and the leak rate, which is one minus the recall. The evaluation results are split into two sets. First, Table 5 shows results using a more traditional micro-average recall.

TABLE 5

|  | Micro-average Recall | Probability of a Leak |
| --- | --- | --- |
| Direct identifiers | 0.9758 | 0.0242 |
| Quasi-identifiers | 0.8757 | 0.1243 |

The second set of results show the 95% confidence intervals for the probability of re-identification using an evaluation system and method in accordance with an embodiment of the present disclosure. A mean value for direct identifiers of about 0.0074, and a mean value for quasi-identifiers of about 0.0022 were calculated. FIG. 2 shows a comparison 200 of a confidence interval for direct identifiers derived from the data to the benchmark. An upper confidence limit 201 for the re-identification risk from the data is below an upper confidence limit 211 of the benchmark distribution. Therefore, the risk of re-identification for direct identifiers is acceptably small.

Figure 3:
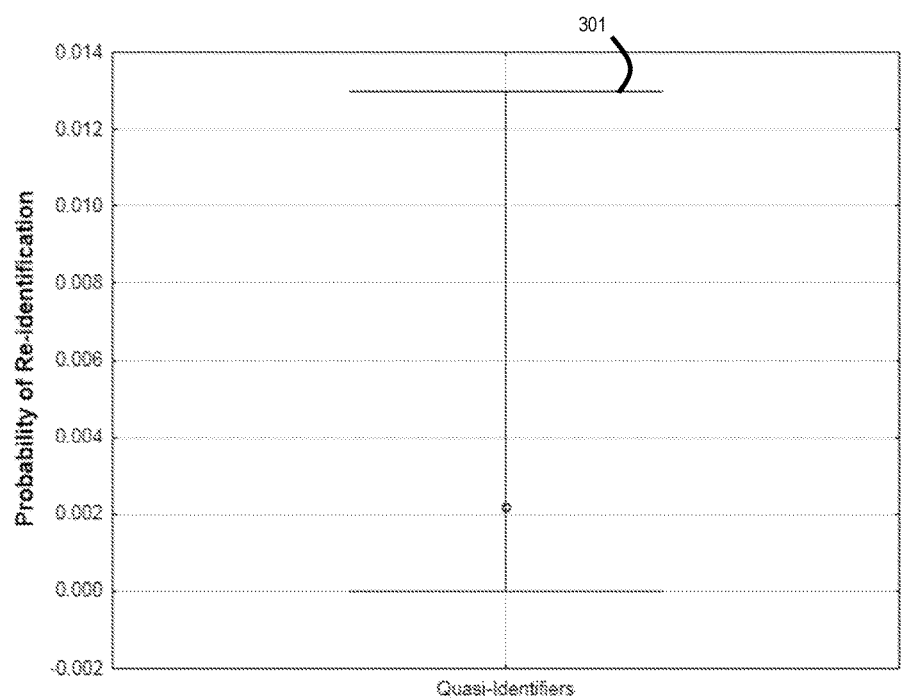
FIG. 3 illustrates 95% confidence interval for the quasi-identifiers using embodiments in accordance with the present disclosure.

FIG. 3 illustrates 95% confidence interval for the quasi-identifiers using embodiments in accordance with the present disclosure. The upper confidence limit 301 is below the 0.2 threshold that is used in the example. Therefore, the risk of re-identification for quasi-identifiers is acceptably small.

Comparison of the results in FIG. 2 and FIG. 3 shows that numeric outcomes of the evaluation will be different. Because embodiments take context into account, results obtained by using the embodiments often will be less pessimistic about the real risks. However, this is not always the case, and differences may exist in numerical values and conclusions about the risk of re-identification using another corpus.

Conclusion:

Embodiments provide a new system and method for performance evaluation of freeform text de-identification tools. Embodiments take into account the many subtleties and distributional variances seen in real data sets. Embodiments attempt to correct for poorly distributed evaluation corpora, account for the data release context, and avoid the often optimistic assumptions about re-identification that are made using the more traditional evaluation approach. This system and method may provide a more realistic estimate of the true probability of re-identification.

Some embodiments may use a conservative assumption that risk for re-identification depends on only a number and type of identifiers remaining in the documents. Some embodiments may forego this conservative assumption by determining how the risk is affected if certain information is suppressed or generalized. Such embodiments may model a case where Pr(reid|leak)<1, which provides further reductions in an estimated probability of re-identification.

For very rare diseases, a risk of re-identification may still be present with a single quasi-identifier. Embodiments may consider further implications of disease frequency in the global population and re-identification risks.

Ordinarily, every document pertains to a single respective patient. In some cases, such as clinical study reports from clinical trials, a single document will have information about multiple patients. Now there is a regulatory requirement to share such documents by the European Medicines Agency. Estimation of the probability of re-identification using some embodiments requires splitting per-patient information into separate pseudo-documents. In practice, much of the information about the same patient tends to be close to each other, making it easier to automate such splitting. Some embodiments may include a splitting process in order to calculate the probability of re-identification for documents with information about multiple patients.

Embodiments further may provide an improved database system, e.g., for medical research purposes, that has less risk of patient re-identification. For example, in response to a request for a data set to support medical studies, embodiments in accordance with the present disclosure may provide a subset of available data, the subset having been selected and/or modified according to the methods disclosed herein.

Figure 4:
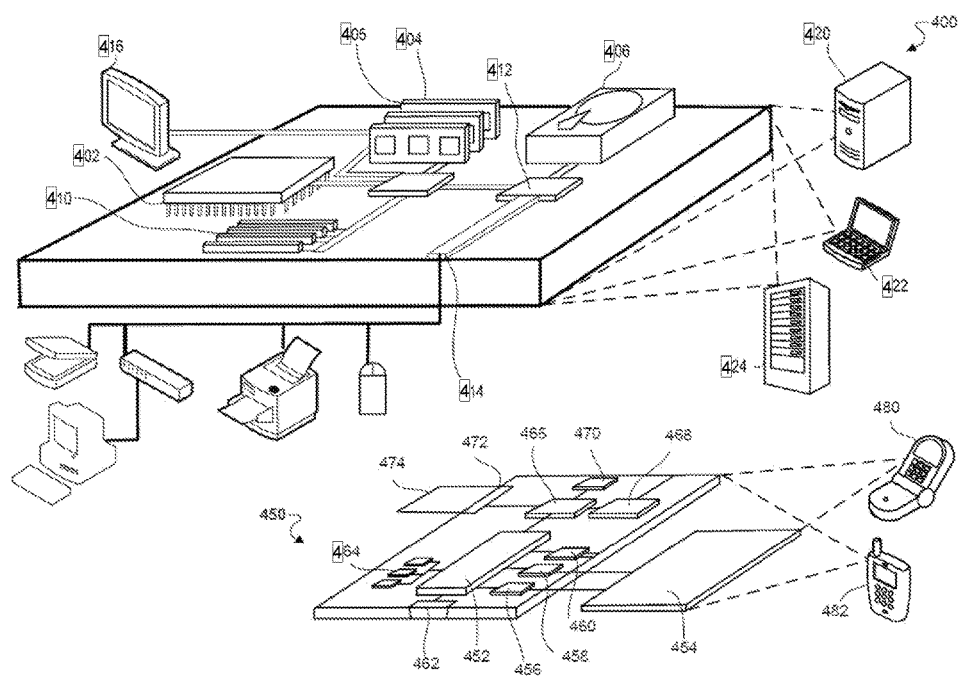
FIG. 4 illustrates a block diagram of computing devices on which the processes described herein, or portions thereof, may be implemented, in accordance with an embodiment of the present disclosure.

FIG. 4 shows an example of a computing device 400 and a mobile computing device 450 that may be used to implement the embodiments described here. The computing device 400 represents various forms of digital computers, such as laptops, desktops, workstations, personal digital assistants, servers, blade servers, mainframes, and other appropriate computers. The mobile computing device 450 represents various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 may process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions may be stored in an information carrier. The instructions, when executed by one or more processing devices (for example, processor 402), perform one or more methods, such as those described above. The instructions may also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424.

Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 may execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 may be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions may also be stored by one or more storage devices, such as one or more computer- or machine-readable mediums (for example, the memory 464, the expansion memory 474, or memory on the processor 452). In some implementations, the instructions may be received in a propagated signal, for example, over the transceiver 468 or the external interface 462.

Figure 5:
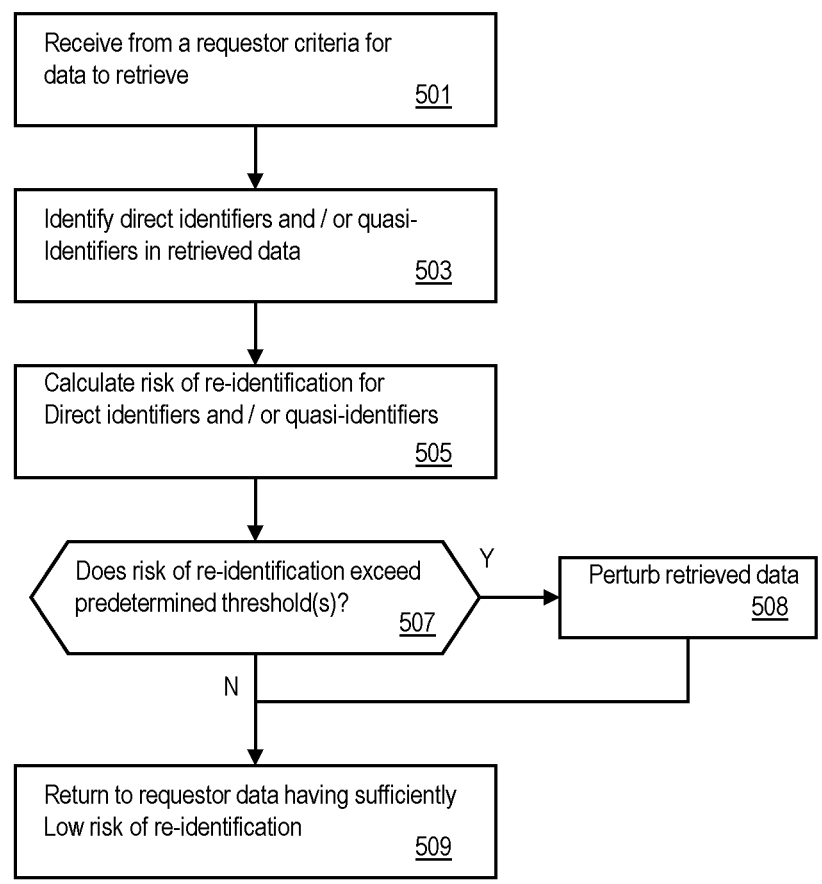
FIG. 5 illustrates a flow diagram of a process in accordance with an embodiment of the present disclosure.

FIG. 5 illustrates a process 500 in accordance with an embodiment of the present disclosure. Process 500 begins with step 501, at which a database system receives from a requestor (e.g., an end-user) for some patient data.

Next, process 500 transitions to step 503, at which embodiments in accordance with the present disclosure, implemented in or using the database system of step 501, identifies identifiers and/or quasi-identifiers in the retrieved data.

Next, process 500 transitions to step 505, at which embodiments calculate a probability of re-identification for the direct identifiers and/or quasi-identifiers. Probability may be expressed as a numeric value within the closed interval of [0, 1], or equivalently within the closed percentage interval of [0%, 100%].

Next, process 500 transitions to decision step 507, at which embodiments make a decision whether a probability of re-identification (based upon the direct identifiers, the quasi-identifiers, or a combination of both types of identifiers) exceeds a predetermined threshold. The threshold may be predetermined by way of, e.g., provisioning by a system administrator, or a hard-coded threshold (e.g., less than 0.05%), or by calculation based on other characteristics of the returned data (e.g., a lower threshold for either larger or smaller returned data sets), and so forth.

If the result of decision step 507 is positive, process 500 transitions to step 508, at which the returned data may be perturbed until the calculated probability of re-identification is reduced below the predetermined threshold.

Upon completion of step 508, process 500 transitions to step 509, at which data having a sufficiently low probability of re-identification is returned to the requestor. If the result of decision step 507 is negative, then process 500 transitions directly to step 509. Upon completion of step 509, process 500 may end.

Figure 6:
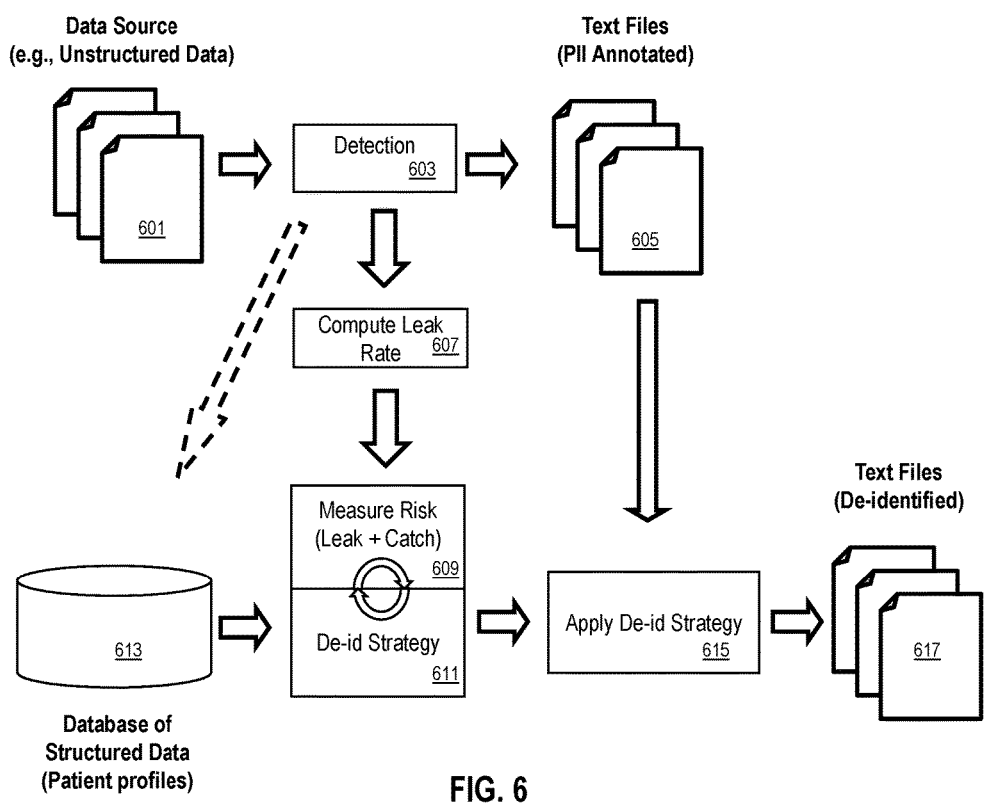
FIG. 6 illustrates a functional block diagram of a system to produce de-identified text files, in accordance with an embodiment of the present disclosure.

FIG. 6 illustrates a functional block diagram of a system 600 to produce de-identified text files, in accordance with an embodiment of the present disclosure. System 600 takes as input a set of data 601, as one or more unstructured text files and/or structured data sources.

Embodiments may draw upon several different sources for data 601. In a first scenario, data 601 may include a structured dataset containing substantially all identifying elements (DIs and QIs), and may include textual data having a subset of the PHI in the structured data, including narratives.

In a second scenario, data 601 may include a structured dataset containing some identifying elements (DIs and QIs), and an unstructured dataset contains some identifying elements (DIs and QIs). There may be some overlap between the structured and unstructured datasets, but neither contains all of the data. Identifiers from both sets should be combined into a complete dataset before risk measurement and transformation.

In a third scenario, data 601 may include an unstructured dataset containing substantially all of the identifying elements (DIs and QIs) (i.e., there is no structured data). Embodiments may extract a structured dataset from the unstructured dataset, and use the extracted structured dataset as an input to a process using system 600.

The unstructured data 601 is then provided to a detection module 603, which may be implemented as a set of computer programming instructions that may be executed on the computing system illustrated in FIG. 4. Detection module 603 detects identifiers, including direct identifiers and quasi-identifiers.

The output of detection module 603 may be stored in memory as a set of one or more files, e.g., text files that have been annotated to indicate the detected PII information. The output of detection module 603 also may be supplied to a leak rate computation module 607, which may be implemented as a set of computer programming instructions that may be executed on the computing system illustrated in FIG. 4. Leak rate computation module 607 may calculate leak rates (also known as recall rates) in accordance with methods disclosed elsewhere within the present disclosure. Leak rate computation module 607 may implement a multi-step process well understood in the art of information extraction.

In parallel, detection module 603 also may update structured patient data stored in database 613. The dotted line interface between detection module 603 and database 613 indicates that information from detection module 603 may be stored in database 613 storing the structured dataset, as described above as the second and third scenarios.

The computed leak rates then may be supplied to a risk measurement module 609, which may be implemented as a set of computer programming instructions that may be executed on the computing system illustrated in FIG. 4. Risk measurement module 609 may provide leak risks and catch risks in accordance with methods disclosed elsewhere within the present disclosure.

System 600 may further include a de-identification strategy module 611, which may accept information from risk measurement module 609 and structured patient data from database 613, in order to produce a strategy for how patient data should be perturbed in order to meet the de-identification risk goals or targets. An interaction between risk measurement module 609 and de-identification strategy module 611 may be implemented as an iterative process, including substeps of testing a strategy and calculating if the strategy produces a sufficiently low risk. In particular, embodiments include consideration of structured data from database 613, a calculation of Risk(X|catch), and a calculation of the combined risk.

System 600 may further include a module 615 to apply the de-identification strategy determined by de-identification strategy module 611. The de-identified patient data then may be stored in a data storage, e.g., as one or more text files 617.

Figure 7:
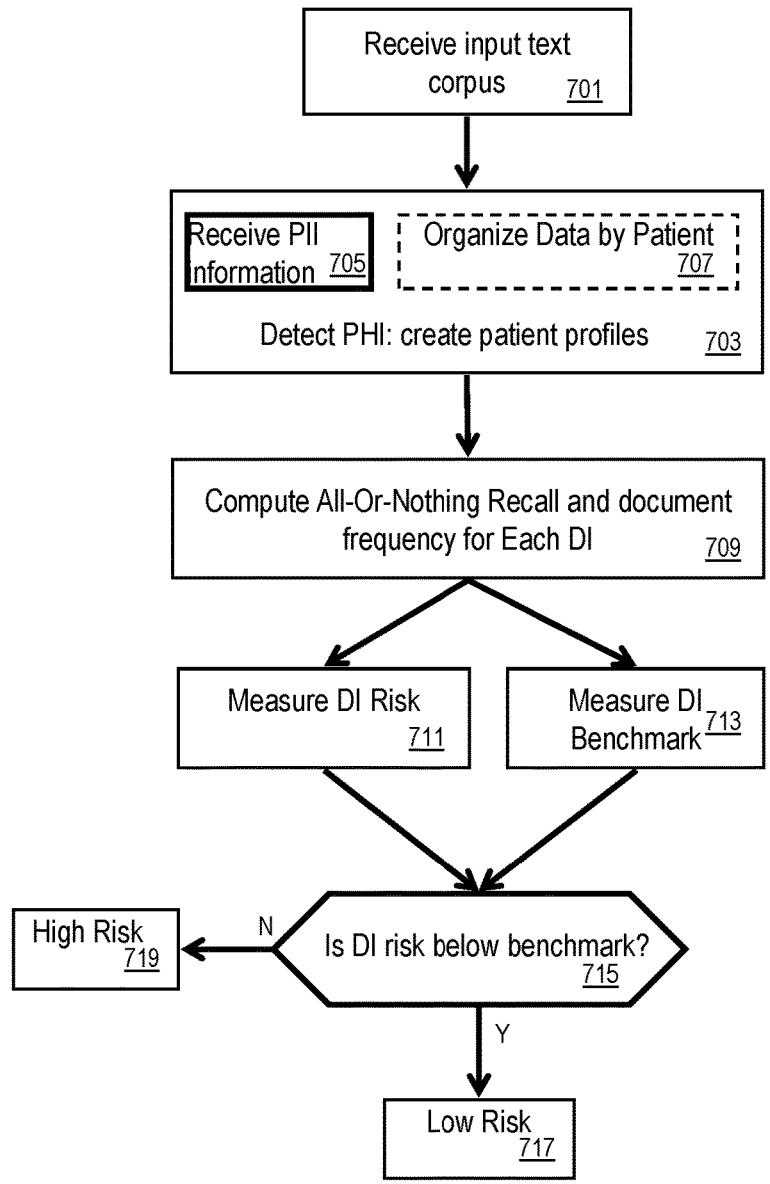
FIG. 7 illustrates a process for direct identifier (DI) risk measurement, in accordance with an embodiment of the present disclosure.

FIG. 7 illustrates a process 700 for DI risk measurement in accordance with an embodiment of the present disclosure. Process 700 begins at step 701, at which an input text corpus is received. For example, the corpus may be received from one or more databases of medical records, in response to a request for such information from an analyst.

Next, process 700 proceeds to step 703, at which protected health information (PHI) is detected and patient profiles are created. More specifically, step 703 includes a substep 705 of receiving an identification of detected personal identifying information (PII), and a substep 707 of organizing the detected PII data by patient. In substep 705, the details of how the PII had been detected is not important to process 700. Process 700 may be practiced with substantially any PII detection engine.

Next, process 700 proceeds to step 709, at which the all-or-nothing recall rates and the document frequency is computed for each direct identifier (DI).

Next, process 700 proceeds to step 711, at which the DI re-identification risk is measured or calculated. For example, Equations (20a)-(20b) may be used to calculate a point estimate of a re-identification risk, and the overall probability distribution of re-id risk for direct identifiers may be formulated as shown in Equations (22a)-(22b).

Next, either in series with step 711 (either before or after), or concurrently with step 711, process 700 performs step 713, at which a DI benchmark is measured or calculated by use of Equations (22a)-(22b). Equations (30a)-(30b) are a numerical illustration of applying Equations (22a)-(22b).

Next, process 700 proceeds to decision step 715, at which a decision is made whether or not the DI re-identification risk from step 711 is below the DI benchmark measured or calculated at step 713. If the outcome of decision step 715 is positive, then control of process 700 transitions to step 717, at which a low re-identification risk is declared, and further processing consistent with a declaration of low re-identification risk may be taken. For example, if low re-identification risk exists, then the corpus as presently modified may be released.

If the outcome of decision step 715 is negative, then control of process 700 transitions to step 719, at which a high re-identification risk is declared, and further processing consistent with a declaration of high re-identification risk may be taken. For example, if high re-identification risk exists, then the corpus may be modified further in order to try to reduce the re-identification risk, and at least a portion of process 700 may be repeated.

Figure 8:
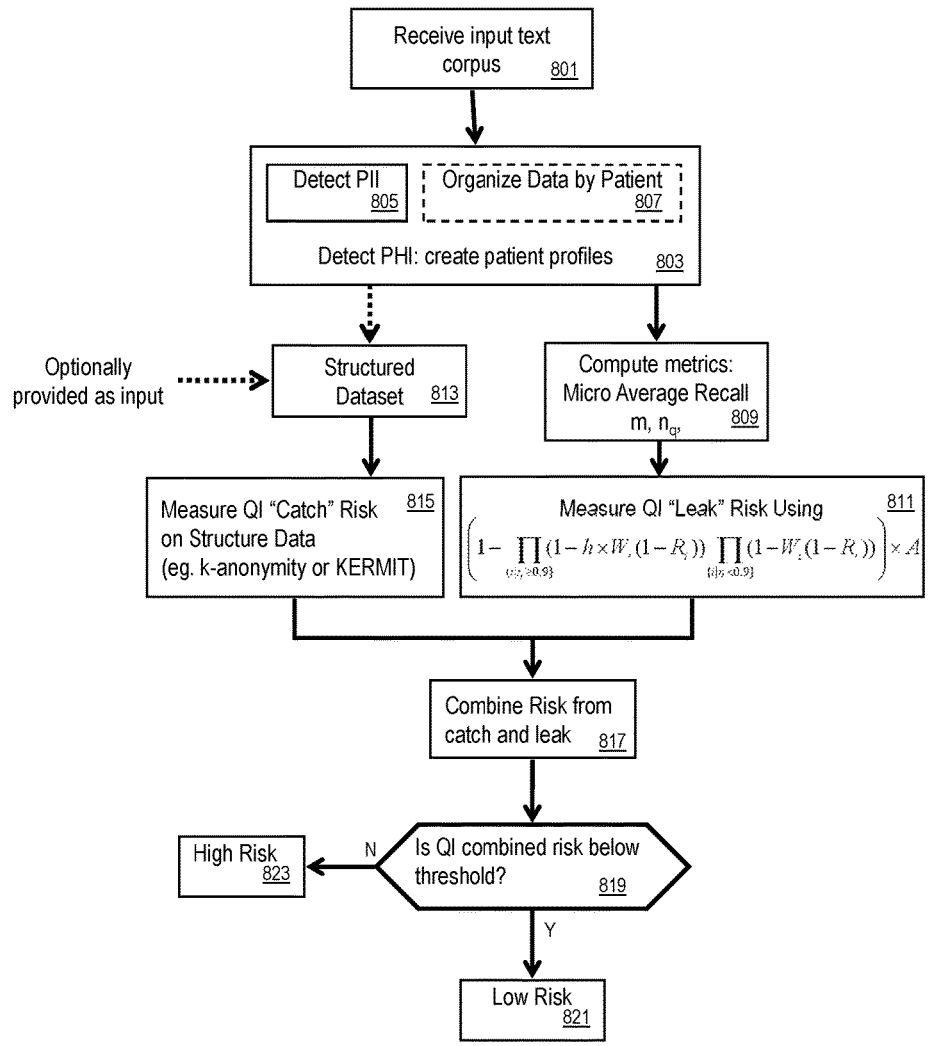
FIG. 8 illustrates a process to measure quasi-identifier (QI) re-identification risk by use of separate processes, in accordance with an embodiment of the present disclosure.

FIG. 8 illustrates a process 800 to measure quasi-identifier (QI) re-identification risk by use of separate processes, in accordance with an embodiment of the present disclosure. Process 800 begins at step 801, at which an input text corpus is received. Step 801 may be substantially the same as step 701 of process 700.

Next, process 800 proceeds to step 803, at which protected health information (PHI) is detected and patient profiles are created. More specifically, step 803 includes a substep 805 of detecting personal identifying information (PII), and a substep 807 of organizing the data by patient. Steps 803, 805 and 807 may be substantially the same as steps 703, 705 and 707, respectively, of process 700.

Next, process 800 proceeds to step 809, at which metrics are computed. In particular, a micro-average recall rate, characterized by m and $n_q$, may be computed in accordance with Equations (5a)-(5d).

Next, process 800 proceeds to step 811, at which a quasi-identifier (QI) leak rate may be calculated in accordance with Equation (35) below.

$$\left(1 - \prod_{\{i | r_i \geq 0.9\}} (1 - h \times W_i(1 - R_i)) \prod_{\{i | r_i < 0.9\}} (1 - W_i(1 - R_i))\right) \times A \quad (35)$$

In some embodiments, process 800 may include a structured dataset step 813. The input to step 813 is structured data organized by patients. The structured data input may be data detected and extracted from textual document. The structured data then is organized by patient into patient profiles from step 803. If an equivalent structured dataset is already available, then step 813 may use the available structured dataset as input. The output of step 813 is a structured dataset, in the form of patient profiles, which may include either the input dataset or the two datasets merged together. The output of step 813 then may be supplied to step 815, at which a QI "catch" risk is calculated or measured on the structured data. Step 815 may use a calculation process such as k-anonymity or usage of the KERMIT process. The result of this calculation is Risk(X|catch).

Next, process 800 proceeds to step 817, at which the re-identification risks from step 811 and step 815 are combined in accordance with Equation (1).

Next, process 800 proceeds to decision step 819, at which a decision is made whether or not the combined QI catch and leak re-identification risk from step 817 is below a predetermined QI threshold risk. If the outcome of decision step 819 is positive, then control of process 800 transitions to step 821, at which a low re-identification risk is declared, and further processing consistent with a declaration of low re-identification risk may be taken. For example, if low re-identification risk exists, then the corpus as presently modified may be released.

If the outcome of decision step 819 is negative, then control of process 800 transitions to step 823, at which a high re-identification risk is declared, and further processing consistent with a declaration of high re-identification risk may be taken. For example, if high re-identification risk exists, then the corpus may be modified further in order to try to reduce the re-identification risk, and at least a portion of process 800 may be repeated.

Figure 9:
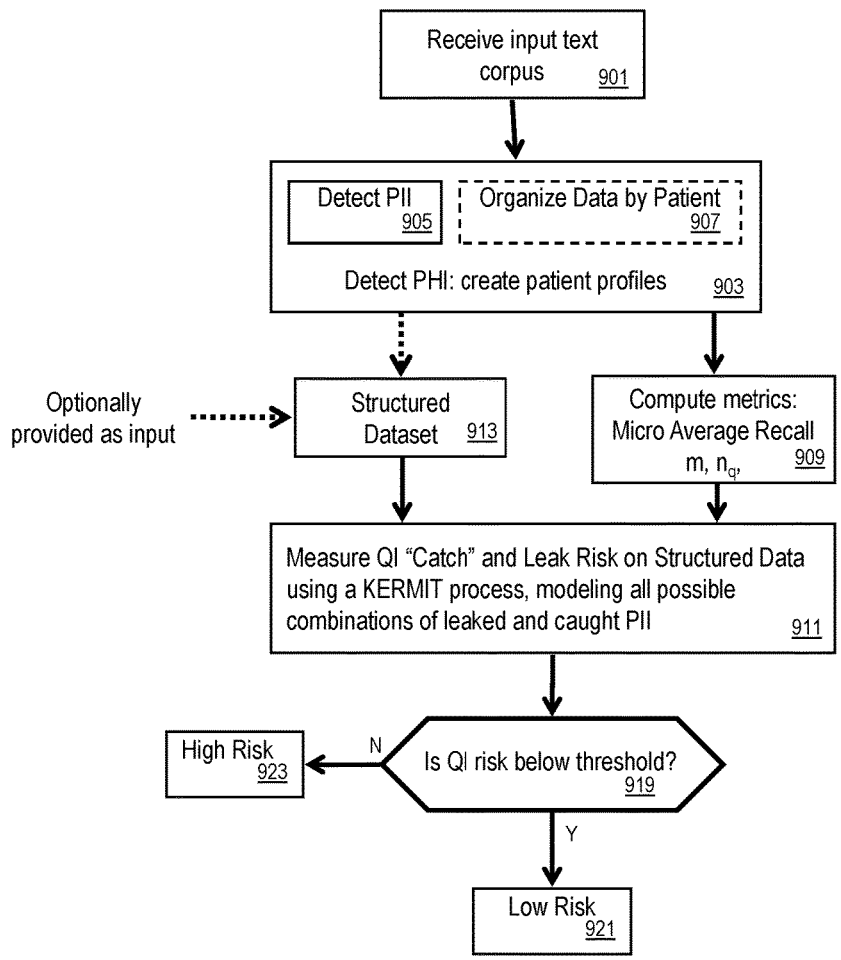
FIG. 9 illustrates a process to measure QI re-identification risk by use of a combined process, in accordance with an embodiment of the present disclosure.

FIG. 9 illustrates a process 900 to measure quasi-identifier (QI) re-identification risk by use of a combined process, in accordance with an embodiment of the present disclosure. Process 900 begins at step 901, at which an input text corpus is received. Steps 901, 903, 905, 907, 909 and 913 may be substantially the same as steps 801, 803, 805, 807, 809 and 813 of process 800, respectively.

In process 900, step 911 accepts the outputs of step 909 and step 913. Step 911 measures or computes a combined QI catch and leak re-identification risk on the structured data, by use of a KERMIT process. Step 911 may model substantially all possible combinations of leaked and caught PII.

Next, process 900 proceeds to decision step 919, at which a decision is made whether or not the combined QI catch and leak re-identification risk from step 911 is below a predetermined QI threshold risk. If the outcome of decision step 919 is positive, then control of process 900 transitions to step 921, at which a low re-identification risk is declared, and further processing consistent with a declaration of low re-identification risk may be taken. For example, if low re-identification risk exists, then the corpus as presently modified may be released.

If the outcome of decision step 919 is negative, then control of process 900 transitions to step 923, at which a high re-identification risk is declared, and further processing consistent with a declaration of high re-identification risk may be taken. For example, if high re-identification risk exists, then the corpus may be modified further in order to try to reduce the re-identification risk, and at least a portion of process 900 may be repeated.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present disclosure may be dependent on various considerations, such as the speed or efficiency requirements of the system, the particular function, and the particular software or hardware systems being utilized.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112(f), and any claim without the word "means" is not so intended.

We claim:

1. A computer-implemented method to reduce a risk of re-identification of personal information (PI) of a plurality of patients in a plurality of unstructured documents while preserving the PI and analytic quality and maintaining a justifiable low risk of re-identification in a data set, the method comprising the steps of:

on a processor:
  comparing a first sample of the plurality of unstructured documents annotated by a human authority to the first sample of the plurality of unstructured documents annotated by the computing device to determine metrics of leak rates indicating PI of one or more patients missed by the annotation by the computing device;
  constructing one or more structured documents corresponding to the one or more patients missed by the annotation by the computing device;
  determining a de-identification strategy to maximize analytic quality of the one or more structured documents and to maintains the risk of re-identification below a maximum acceptable risk threshold, wherein the de-identification strategy defines what PI is to suppress, perturb, and retain; and
  applying the determined de-identification strategy to the plurality of unstructured documents by
    retrieving a data set from a database communicatively coupled to the processor, the data set is selected to include the plurality of unstructured documents including patient medical records that meet a predetermined criteria;
    identifying direct identifiers and quasi-identifiers in the data set;
    calculating a first probability of re-identification from the direct identifiers and a second probability of re-identification from the quasi-direct identifiers;
    perturbing the data set if one of the first probability or second probability exceeds a respective predetermined threshold, to produce a perturbed data set; and
    providing the perturbed data set.

2. The method of claim 1, wherein the step of determining comprises a step of calculating a probability of re-identification of direct and quasi-identifiers.

3. The method of claim 2, wherein the step of calculating the probability is derived from any of the direct identifiers, the quasi-identifiers, and a combination of direct and quasi-identifiers.

4. The method of claim 3, wherein the determined de-identification strategy is applied to the plurality of unstructured documents until the probability of re-identification is below the predetermined threshold.

5. The method of claim 2, further comprising a step of computing the probability of re-identification from the metrics of the leak rates, wherein two leaks identified in a same document of the plurality of unstructured documents produces a re-identification.

6. The method of claim 2, further comprising a step of computing the probability of re-identification from the metrics of the leak rates and a confidence interval by use of distributions of values, wherein two leaks produces a re-identification.

7. The method of claim 2, wherein the probability of re-identification from the metrics of the leak rates is computed using a KERMIT process and modeling combinations of leak and catch for al direct and quasi-identifiers.

8. The method of claim 1, further comprising a step of collecting information about each unique patient of the plurality of patients into a single document in the data set, wherein only one of the plurality of documents references the single patient.

9. The method of claim 1, further comprising a step of calculating a respective confidence interval of the probability.

10. The method of claim 1, wherein the maximum acceptable risk threshold comprises is calculated from sensitivity of PI.

11. The method of claim 1, wherein the maximum acceptable risk threshold comprises is calculated from a patient harm caused by revelation of the information.

12. The method of claim 1, wherein the data set is perturbed until an upper limit of a probability confidence limit of the risk of re-identification is less than an upper limit of a probability confidence limit of a benchmark threshold risk.

13. A system to reduce a risk of re-identification of personal information (PI) of a plurality of patients in a plurality of unstructured documents while preserving the PI and analytic quality and maintaining a justifiable low risk of re-identification in a data set, the method comprising:
   a processor coupled to a memory, the processor is configured to:
   compare a first sample of the plurality of unstructured documents annotated by a human authority to the first sample of the plurality of unstructured documents annotated by the computing device to determine metrics of leak rates indicating PI of one or more patients missed by the annotation by the computing device;
   construct one or more structured documents corresponding to the one or more patients missed by the annotation by the computing device;
   determine a de-identification strategy to maximize analytic quality of the one or more structured documents and to maintains the risk of re-identification below a maximum acceptable risk threshold, wherein the de-identification strategy defines what PI is to suppress, perturb, and retain; and
   apply the determined de-identification strategy to the plurality of unstructured documents by
      retrieving a data set from a database communicatively coupled to the processor, the data set is selected to include the plurality of unstructured documents including patient medical records that meet a predetermined criteria;
      identifying direct identifiers and quasi-identifiers in the data set;
      calculating a first probability of re-identification from the direct identifiers and a second probability of re-identification from the quasi-direct identifiers;
      perturbing the data set if one of the first probability or second probability exceeds a respective predetermined threshold, to produce a perturbed data set; and
      providing the perturbed data set.

* * * * *

UNITED STATES PATENT AND TRADEMARK OFFICE
CERTIFICATE OF CORRECTION

PATENT NO. : 10,395,059 B2
APPLICATION NO. : 15/451440
DATED : August 27, 2019
INVENTOR(S) : Scaiano et al.

Page 1 of 1

It is certified that error appears in the above-identified patent and that said Letters Patent is hereby corrected as shown below:

On the Title Page

Item (63), Column 1, under "Related U.S. Application Data", after "application No. 15/320,240", and before "filed" insert --Dec. 19, 2016--.

On page 2, item (56), Column 2, Line 20, under "OTHER PUBLICATIONS", replace "CRISIS" with "CRiSIS".

In the Drawings

FIG. 7, Block 705, replace "Receive PII nformation" with "Receive PII Information".

In the Specification

In Column 4, Line 47, replace "(PII))" with "(PHI)".

In Column 5, Line 13, replace "(i.e., Risk(X|catch)" with "(i.e., Risk(X|catch))".

In Column 20, Line 16, replace "Qis" with "QIs".

In Column 23, Line 24, delete " " after "expression:" and before "combined".

In Column 26, Line 12, the equation and equation number are overlapping.

In the Claims

In Column 36, Line 65, replace "al" with "all".

In Column 37, Line 11, delete "comprises".

Signed and Sealed this
Twenty-second Day of October, 2019

Andrei Iancu
*Director of the United States Patent and Trademark Office*